(12) United States Patent
Montbach et al.

(10) Patent No.: US 9,235,075 B2
(45) Date of Patent: Jan. 12, 2016

(54) ELECTRONIC DISPLAY WITH PATTERNED LAYER

(75) Inventors: Erica N. Montbach, Kent, OH (US); Asad A. Khan, Kent, OH (US); Clinton I. Braganza, Kent, OH (US); Nithya Venkatarman, Wooster, OH (US)

(73) Assignee: KENT DISPLAYS INCORPORATED, Kent, OH (US)

( * ) Notice: Subject to any disclaimer, the term of this patent is extended or adjusted under 35 U.S.C. 154(b) by 392 days.

(21) Appl. No.: 13/477,602

(22) Filed: May 22, 2012

(65) Prior Publication Data

US 2013/0314621 A1 Nov. 28, 2013

(51) Int. Cl.
*G02F 1/1335* (2006.01)
*G02F 1/1333* (2006.01)
*G02F 1/1347* (2006.01)
*G02F 1/137* (2006.01)

(52) U.S. Cl.
CPC ........ *G02F 1/13338* (2013.01); *G02F 1/13718* (2013.01)

(58) Field of Classification Search
CPC ... G02F 1/137; G02F 1/1333; G02F 1/13338; G02F 1/13718; G02F 1/13475; G02F 2001/13478; B43L 1/00
USPC ................... 349/12, 110, 115, 176; 345/173
See application file for complete search history.

(56) References Cited

U.S. PATENT DOCUMENTS

| | | |
|---|---|---|
| 4,525,032 A | 6/1985 | Hilsum |
| 4,685,771 A | 8/1987 | West et al. |
| 5,347,811 A | 9/1994 | Hasegawa et al. |
| 5,453,863 A | 9/1995 | West et al. |
| 5,493,430 A | 2/1996 | Lu et al. |
| 5,594,562 A | 1/1997 | Sato et al. |
| 5,644,330 A | 7/1997 | Catchpole et al. |

(Continued)

FOREIGN PATENT DOCUMENTS

| | | |
|---|---|---|
| JP | 05053537 | 3/1993 |
| JP | 08035759 | 2/1996 |

(Continued)

OTHER PUBLICATIONS

Dry Erase Presentation Boards, Retrieved from http://speakeasydryerase.com/files/specifications/selfadhesivespec.pdf Feb. 19, 2009.

(Continued)

*Primary Examiner* — Dung Nguyen
*Assistant Examiner* — Tai Duong
(74) *Attorney, Agent, or Firm* — Pearne & Gordon LLP

(57) ABSTRACT

An electronic display includes electrically conductive layers. At least one active layer is disposed between adjacent electrically conductive layers. The active layer includes cholesteric liquid crystal material. The display includes a front transparent substrate behind which the electrically conductive layers are disposed. A back component is disposed at a back of the display below the active layer. At least one patterned layer is disposed at at least one of the following locations: on, in or near the front substrate and as an interlayer between the front substrate and the back component. The patterned layer is opaque or semitransparent. Electronic circuitry applies a voltage to the conductive layers that enables at least one of erasing or writing of the active layer. The active layer and the patterned layer cooperate to produce an image on the display.

37 Claims, 15 Drawing Sheets

(56) References Cited

U.S. PATENT DOCUMENTS

| | | | |
|---|---|---|---|
| 5,691,795 A | 11/1997 | Doane et al. | |
| 5,748,277 A | 5/1998 | Huang et al. | |
| 5,847,798 A | 12/1998 | Yang et al. | |
| 5,920,364 A | 7/1999 | Akins et al. | |
| 5,933,203 A | 8/1999 | Wu et al. | |
| 6,104,448 A | 8/2000 | Doane et al. | |
| 6,133,895 A | 10/2000 | Huang | |
| 6,154,190 A | 11/2000 | Yang et al. | |
| 6,268,839 B1 | 7/2001 | Yang et al. | |
| 6,359,673 B1 | 3/2002 | Stephenson | |
| 6,377,321 B1 | 4/2002 | Khan et al. | |
| 6,473,072 B1 | 10/2002 | Comiskey et al. | |
| 6,639,578 B1 | 10/2003 | Comiskey et al. | |
| 6,654,080 B1 | 11/2003 | Khan et al. | |
| 6,697,039 B1 | 2/2004 | Yamakawa et al. | |
| 6,727,873 B2 | 4/2004 | Gordon, II et al. | |
| 6,730,862 B1 | 5/2004 | Gasparik | |
| 6,752,430 B2 | 6/2004 | Holt et al. | |
| 6,753,933 B2 | 6/2004 | Cirkel et al. | |
| 6,759,399 B1 | 7/2004 | Petit et al. | |
| 6,788,362 B2 | 9/2004 | Stephenson et al. | |
| 6,788,363 B2 | 9/2004 | Liu et al. | |
| 6,811,815 B2 | 11/2004 | He et al. | |
| 6,816,138 B2 | 11/2004 | Huang et al. | |
| 6,825,829 B1 | 11/2004 | Albert et al. | |
| 6,833,885 B2 | 12/2004 | Hisamitsu et al. | |
| 6,842,210 B2 | 1/2005 | Hashimoto et al. | |
| 6,934,792 B1 | 8/2005 | Nakazawa | |
| 6,999,061 B2 | 2/2006 | Hara et al. | |
| 7,061,559 B2 | 6/2006 | Khan et al. | |
| 7,075,593 B2 | 7/2006 | Vidal et al. | |
| 7,132,064 B2 | 11/2006 | Li et al. | |
| 7,136,048 B2 | 11/2006 | Yrjanainen et al. | |
| 7,170,481 B2 | 1/2007 | Doane et al. | |
| 7,188,996 B2 | 3/2007 | Parker | |
| 7,190,337 B2 | 3/2007 | Miller, IV et al. | |
| 7,236,151 B2 | 6/2007 | Doane et al. | |
| 7,242,394 B2 | 7/2007 | Lahade et al. | |
| 7,245,483 B2 | 7/2007 | Feague et al. | |
| 7,317,437 B2 | 1/2008 | Huang et al. | |
| 7,351,506 B2 | 4/2008 | Schneider et al. | |
| 7,385,656 B2 | 6/2008 | Nose et al. | |
| 7,479,940 B2 | 1/2009 | Marhefka | |
| 7,746,430 B2 | 6/2010 | Kurosaki et al. | |
| 8,139,039 B2 | 3/2012 | Schneider et al. | |
| 8,199,086 B2 | 6/2012 | Doane | |
| 8,228,301 B2 | 7/2012 | Schneider | |
| 8,310,630 B2 | 11/2012 | Marhefka et al. | |
| 2002/0022113 A1 | 2/2002 | Kimura | |
| 2003/0058227 A1 | 3/2003 | Hara et al. | |
| 2003/0071754 A1 | 4/2003 | McEwan | |
| 2003/0137496 A1 | 7/2003 | Stevens et al. | |
| 2003/0156099 A1 | 8/2003 | Yrjanainen et al. | |
| 2003/0156243 A1 | 8/2003 | Yoshihara et al. | |
| 2003/0160741 A1 | 8/2003 | Martinez | |
| 2004/0066374 A1 | 4/2004 | Holloway et al. | |
| 2004/0140964 A1 | 7/2004 | Wang et al. | |
| 2004/0145691 A1 | 7/2004 | Kubota et al. | |
| 2004/0159702 A1 | 8/2004 | Rosenfeld | |
| 2004/0207606 A1 | 10/2004 | Atwood et al. | |
| 2004/0263486 A1 | 12/2004 | Seni | |
| 2005/0079386 A1 | 4/2005 | Brown, Jr. et al. | |
| 2005/0104806 A1 | 5/2005 | Stephenson, III | |
| 2006/0017708 A1 | 1/2006 | Fukui et al. | |
| 2006/0151601 A1 | 7/2006 | Rosenfeld | |
| 2006/0204675 A1 | 9/2006 | Gao et al. | |
| 2006/0262235 A1 | 11/2006 | Vogels et al. | |
| 2006/0267955 A1 | 11/2006 | Hino | |
| 2007/0026163 A1 | 2/2007 | Schneider et al. | |
| 2007/0059901 A1 | 3/2007 | Majumdar et al. | |
| 2007/0063939 A1 | 3/2007 | Bellamy | |
| 2007/0085837 A1 | 4/2007 | Ricks et al. | |
| 2007/0126674 A1 | 6/2007 | Doane | |
| 2007/0152928 A1 | 7/2007 | Doane et al. | |
| 2007/0164980 A1 | 7/2007 | Manning | |
| 2007/0237906 A1 | 10/2007 | Li et al. | |
| 2007/0238080 A1 | 10/2007 | Lynch | |
| 2007/0277659 A1 | 12/2007 | Schneider et al. | |
| 2007/0285385 A1 | 12/2007 | Albert et al. | |
| 2008/0074383 A1 | 3/2008 | Dean | |
| 2008/0151152 A1 | 6/2008 | Yang et al. | |
| 2008/0309598 A1 | 12/2008 | Doane et al. | |
| 2009/0033811 A1 | 2/2009 | Schneider | |
| 2009/0096942 A1 | 4/2009 | Schneider et al. | |
| 2009/0284691 A1 | 11/2009 | Marhefka | |
| 2009/0297860 A1 | 12/2009 | Sasaki et al. | |
| 2010/0149460 A1* | 6/2010 | Akao et al. | 349/75 |
| 2010/0216635 A1 | 8/2010 | Kazmaier et al. | |
| 2010/0245221 A1 | 9/2010 | Khan | |
| 2011/0187650 A1* | 8/2011 | Lee | 345/170 |
| 2011/0193874 A1 | 8/2011 | Jung et al. | |
| 2012/0099030 A1 | 4/2012 | Pishnyak | |
| 2012/0120350 A1 | 5/2012 | Ma | |
| 2013/0314622 A1 | 11/2013 | Braganza et al. | |
| 2014/0043547 A1 | 2/2014 | Marhefka et al. | |

FOREIGN PATENT DOCUMENTS

| | | |
|---|---|---|
| JP | 2001125108 | 5/2001 |
| JP | 2001334693 | 12/2001 |
| JP | 2002163070 | 6/2002 |
| JP | 2004331697 | 11/2004 |
| WO | 2005081779 | 9/2005 |
| WO | 2009065563 | 5/2009 |

OTHER PUBLICATIONS

Etch a Sketch Animator 2000, Retrieved from http://en.wikipedia.org/wiki/Etch_A_Sketch Feb. 19, 2009.

How Magna Doodle Works, Retrieved from http://entertainment.howstuffworks.com/magna-doodle.htm Feb. 19, 2009.

Interactive Whiteboard, Retrieved from http://www.alibaba.com/product-gs/212710367/Interactive_Whiteboard.html Feb. 19, 2009.

Smartboard Polycom IVC, Retrieved from http://dl.austincc.edu/ivc/equipment/smartboardh323.htm.

Office action dated Jun. 24, 2011 from U.S. Appl. No. 11/762,174, filed Jun. 13, 2007.

Final Office action dated Jan. 19, 2012 from U.S. Appl. No. 11/762,174, filed Jun. 13, 2007.

Notice of Allowance issued on Feb. 16, 2012 from U.S. Appl. No. 12/217,158, filed Jul. 1, 2008.

International Search Report for Application No. PCT/US2010/036175 dated Dec. 23, 2010.

Brochure of a Skin Flik™ electronic skin product published in the U.S. after May 22, 2011.

Description of a Skin Flik™ electronic skin product sold in the U.S. after May 22, 2011.

E. Montbach, et al., Flexible Electronic Skin Display, SID Symposium Digest of Technical Papers, 2009, vol. 40, p. 16.

T. Schneider, et al., Flexible Encapsulated Cholesteric LCDs by Polymerization Induced Phase Separation, SID International Symposium Digest of Technical Papers, 2005, vol. 36, p. 1568.

T. Schneider, et al., A Flexible Touch-Sensitive Writing Table, SID International Symposium Digest of Technical Papers, 2008, vol. 39, p. 1840.

U.S. Appl. No. 13/477,638, filed May 22, 2012, entitled Electronic Display With Semi-Transparent Back Layer, Inventor Clinton I. Braganza, et al.

U.S. Appl. No. 13/754,481 dated Jan. 30, 2013.
U.S. Appl. No. 13/927,647 dated Jun. 26, 2013.
U.S. Appl. No. 13/965,255 dated Aug. 13, 2013.
U.S. Appl. No. 13/975,692 dated Aug. 26, 2013.
U.S. Appl. No. 14/069,901 dated Nov. 1, 2013.

Amorphous Silicon Thin-Film Transistor Active-Matric Reflective Cholesteric Liquid Crystal Display: pp. 979-982 (1998).

Flexible Electronic Skin Display, SID Intl. Symp. Disgest Tech., 40 16 (2009) by E. Montbach et al.

J.William Doane and Asad Khan, Cholesteric Liquid Crystals for Flexible Displays, Flexible Flat Panel Displays, 331-354, 2005, John Wiley & Sons, Ltd.

(56) References Cited

OTHER PUBLICATIONS

Office Action dated Jul. 31, 2014 for U.S. Appl. No. 13/477,638.
Office Action dated Oct. 15, 2012 for U.S. Appl. No. 12/729,678.
Final Rejection dated Jun. 5, 2013 for U.S. Appl. No. 12/729,678.

Motion Display Fixed Overlay product, retrieved from http://www.motiondisplay.com/products/fixed_overlay.html#0 prior to Mar. 26, 2013.
Motion Display Technology—How it Works—retrieved from http://www.motiondisplay.com/technology/#2 prior to Mar. 26, 2013.

* cited by examiner

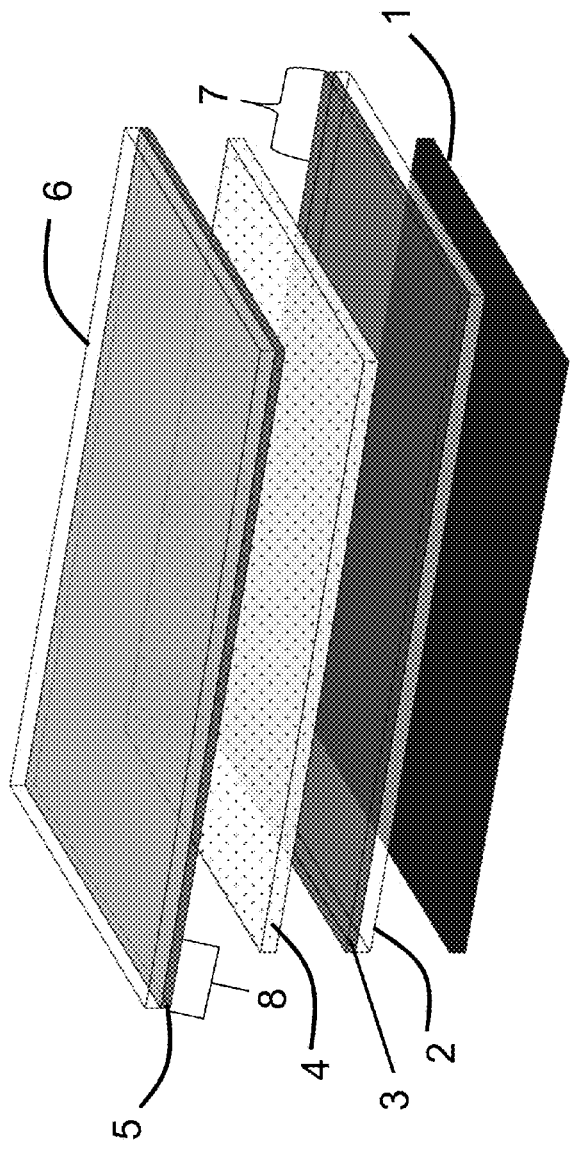
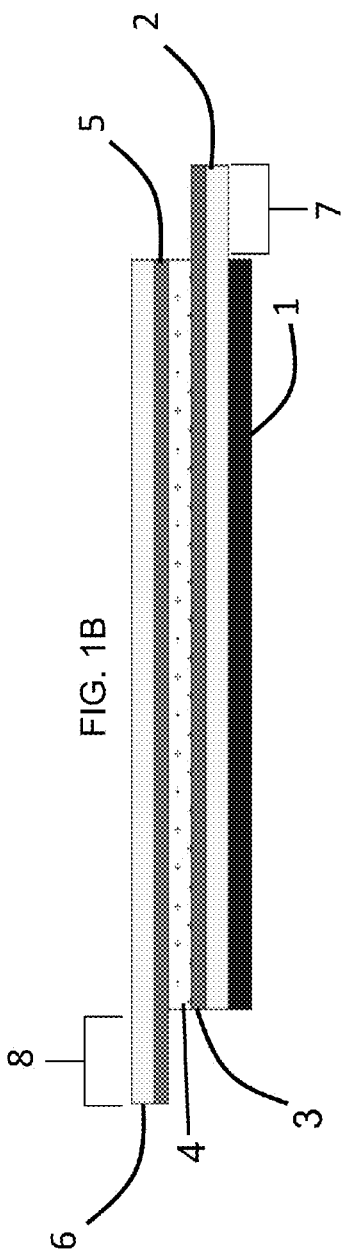
FIG. 1A PRIOR ART
FIG. 1B

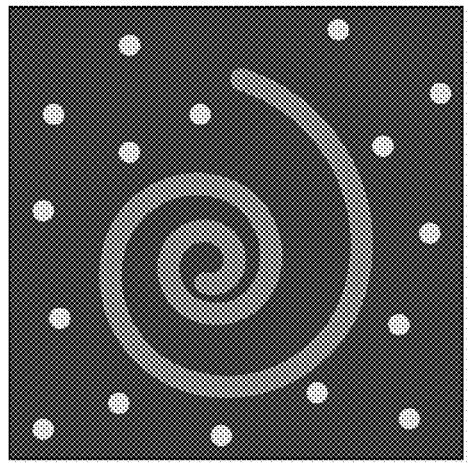
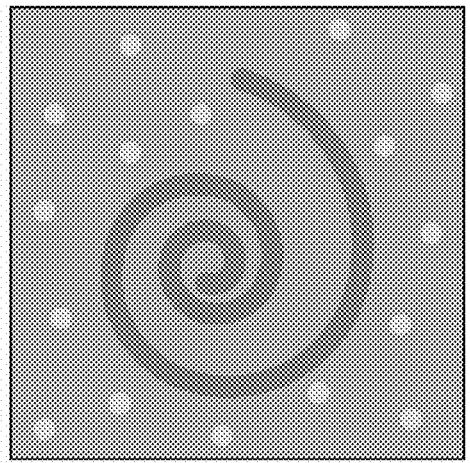
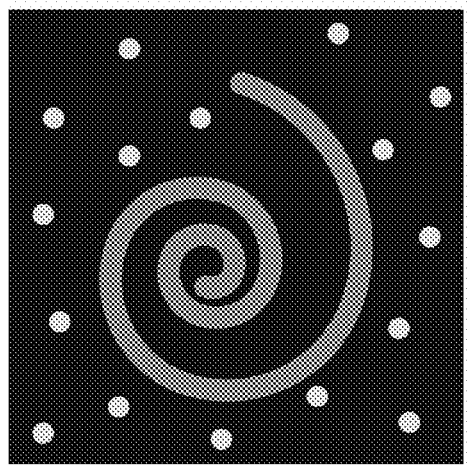
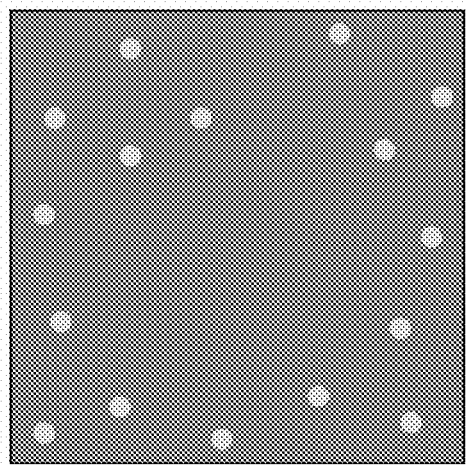
FIG. 3

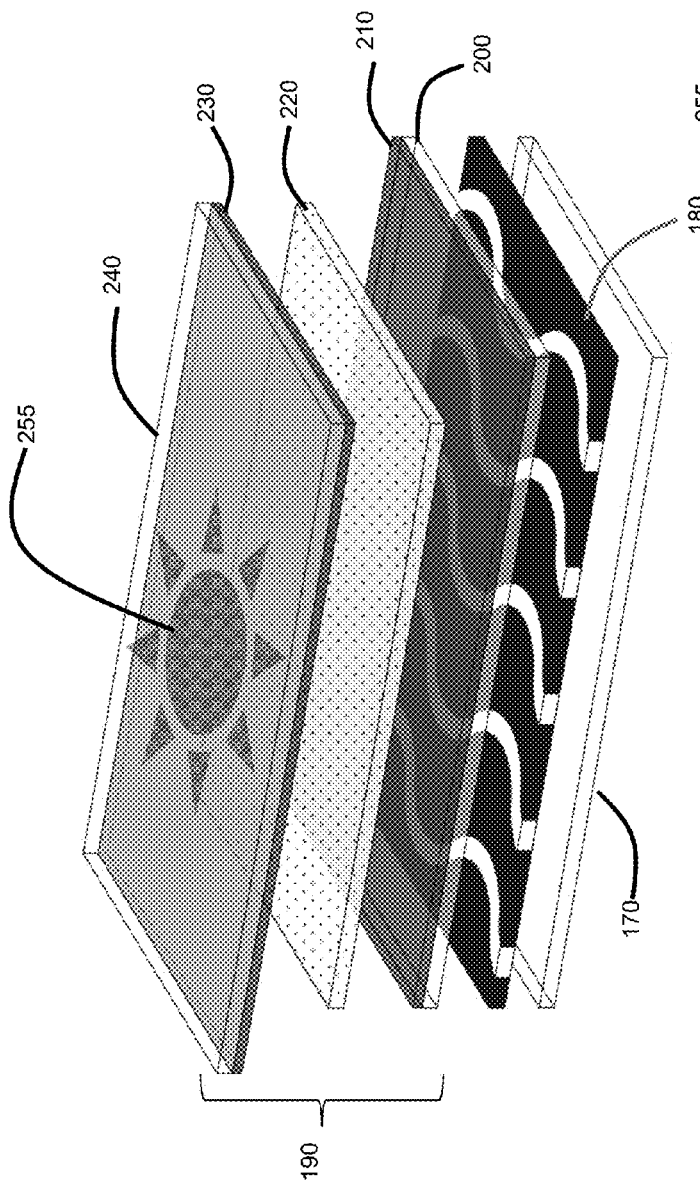
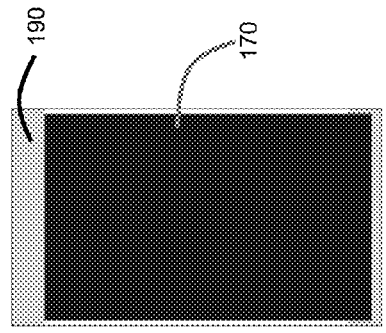
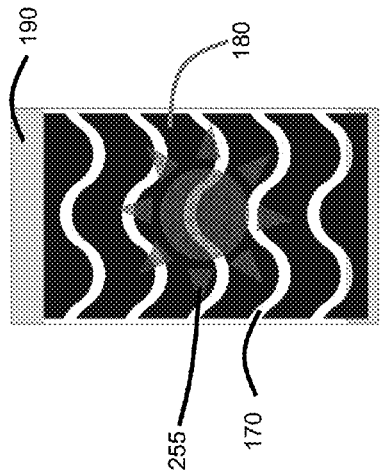

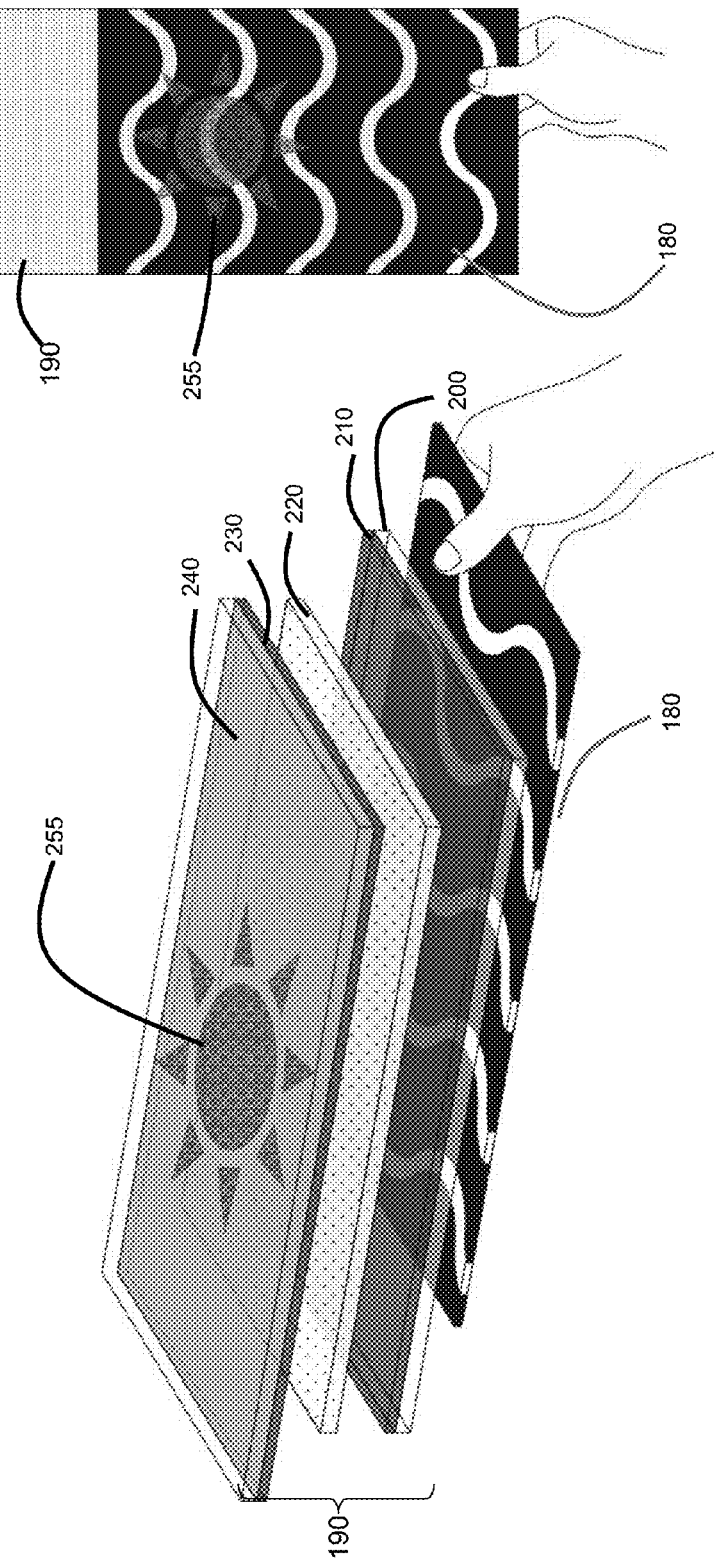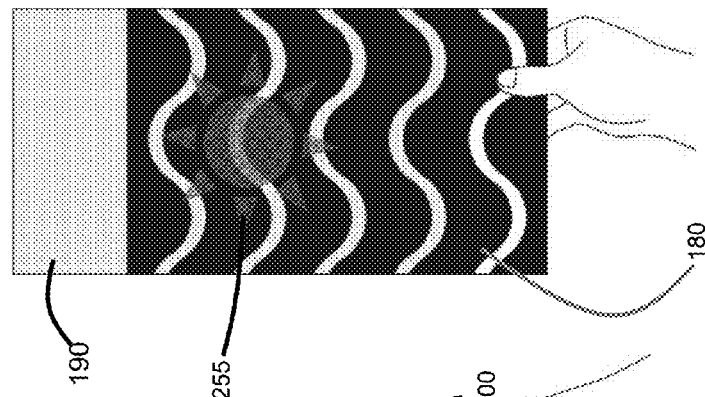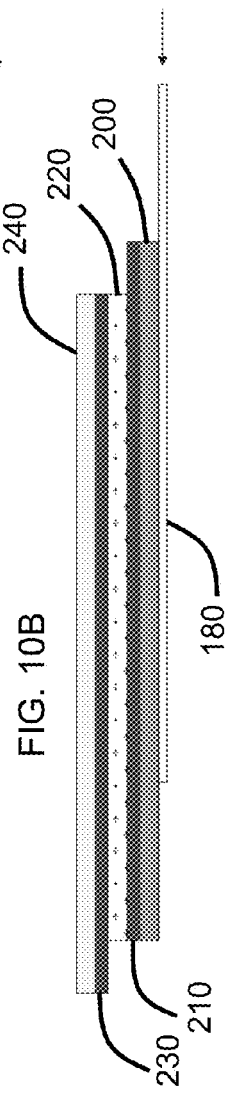

ELECTRONIC DISPLAY WITH PATTERNED LAYER

TECHNICAL BACKGROUND

Flexible, full color, bistable displays continue to be of keen interest to the display industry. The ability to create a flexible bistable display at low cost and with various images has the potential for numerous applications, including: point of sale advertising, hand held device decoration, indicators, fashion statements, writing tablets, electronic labels, among others. Previously Kent Displays Inc. has presented electronic skin (eSkin) and writing tablet displays, which allow for the respective applications of switchable color for consumer device cases and pressure sensitive writing tablets.

The Reflex display technology, based on cholesteric liquid crystals (ChLC), offers reflective, flexible, full-color, bistable displays for numerous applications. The ChLC material is a natural reflector since its inherent chiral structure leads to a Bragg-type reflection of the incident light. There are two bistable textures; the planar texture or reflective state and the focal conic texture which is slightly scattering. Since there is an ink coating on the immediate back side of the display, the focal conic texture being only slightly light scattering, transmits undiffused light to the ink coating, which is then absorbed, making this texture appear as the display's dark state. Because the ink coating is near the cholesteric material, the focal conic texture is essentially or substantially transparent. The Reflex display technology has seen recent success with the Boogie Board® writing tablet, a dedicated electronic writing device as described in U.S. Pat. No. 6,104,448. The writing tablet is a single layer device that allows the user to write and draw images with analog resolution in the same way that they would with pen on paper. In addition to the writing tablet, another Reflex display technology is the eSkin, which offers truly real time switchable color for consumer device case covers, for example, including the added advantage of transforming the device case into a discrete indicator, while creating the ultimate in device personalization. The eSkin includes multiple display layers to create multicolor reflectance.

Flexible cholesteric writing tablet displays such as those made using the processes described in U.S. Pat. No. 7,351, 506, are normally coated with a continuous black absorbing layer to provide contrast of the written image. The black coating is applied on the substrate opposite the one through which one would view the display image (i.e., to the substrate most distal from the viewer of the display). This light absorbing layer is fixed and opaque. In some cases, as disclosed in Published U.S. Patent application Pub. No. 2010/0245221, entitled "Display with Overlayed Electronic Skin," this back painting is skipped altogether. The continuous light absorbing layer allows for a uniform display with one homogenous image. In addition, different color backpaints have also been discussed in the literature, in U.S. Pat. No. 5,493,430. Typical displays show images by creating numerous pixels inside the display where each image is created by switching each pixel to a different color.

This Boogie Board® tablet offers a considerable improvement over previous tablet technologies in that the image can be simply and instantly erased with the push of a button that applies a voltage pulse to electrodes in the tablet. In a cholesteric liquid crystal writing tablet, the liquid crystal is sandwiched between two substrates that are spaced to a particular gap. The upper substrate is flexible and the bottom substrate is painted with a fixed opaque light absorbing dark background. Within the gap is a bistable cholesteric liquid crystal which can exhibit two textures, an essentially transparent (focal conic) texture and a color reflective (planar) texture. The spacing of the cell gap is usually set by plastic or glass spacers that are either cylindrical or spherical in shape. The tablet is initialized by applying voltage pulses to the electrodes to electrically drive the cholesteric material to the essentially transparent texture, with a low haze and transparency greater than any other display state. When one presses on the top substrate with a point stylus or finger, the liquid crystal is locally displaced. Flow induced in the liquid crystal changes its optical texture from essentially transparent to a brilliant reflective color at the location of the stylus. The reflective color contrasts well with the dark background of the lower substrate. An image traced by the stylus or finger will remain on the tablet indefinitely without application of a voltage until erased. Erasure is accomplished by applying a voltage pulse to transparent conducting electrodes on the inner surface of the substrates that drive the cholesteric liquid crystal from its color reflective state back to its essentially transparent state.

The above described principle is disclosed in more detail in U.S. Pat. No. 6,104,448, which is incorporated herein by reference. Polymer dispersions can be used to control the pressure sensitivity and resolution of the image as described in U.S. Patent Application Publication No. 2009/0033811, which is incorporated herein by reference. Other modes of operation and a tablet for multiple color images are described in this patent application publication and a means for select erase is disclosed in U.S. Patent Application Publication No. 2009/0096942, which is incorporated herein by reference and is applicable to the displays of the present disclosure.

The standard mode of operation for the Boogie Board® is termed Mode B where the ChLC is initialized to the focal conic texture and when pressure is applied locally to the display via a pointed stylus that region of the display flows to the planar texture creating a bright written line on a dark background. The other mode of operation is termed Mode A and in this mode the ChLC is initialized to the planar texture and when pressure is applied locally to the display via a pointed sylus that region of the display flows to the focal conic texture or some greyscale creating a dark line on a bright background. In Mode A a continuous AC or series of pulses is applied while the display is addressed with a pointed stylus.

BRIEF DESCRIPTION

We present in this disclosure a display that has one image created from a patterned ink design on the display, however, the image colors change to the various ChLC layer colors along with color mixing between the ChLC and ink layer or layers. The patterned ink design can be located on one or more of the front substrate, the back substrate, or interlayers of the display located between the front and back substrates. The colors of the patterned ink design mix with the ChLC colors creating different looks to the display image depending on the ChLC and ink colors chosen.

In this invention, the display is coated with a patterned ink, paint, or coating. This allows the display to have a patterned multicolor image instead of a homogenous image. The patterned coating can be opaque or semitransparent, but is not merely a patterned opaque ink design on the rearmost layer of the display. For the purposes of this patent, the term semitransparent means: transparent to selected wavelengths of visible light with remaining wavelengths fully or partially absorbed.

Turning now to aspects of this disclosure, a first aspect features an electronic display including electrically conductive layers. At least one active layer is disposed between adjacent electrically conductive layers. The active layer includes cholesteric liquid crystal material. A front transparent substrate is included in the display behind which the electrically conductive layers are disposed. A back component is disposed at a back of the display below the liquid crystal layer. At least one patterned layer is disposed at at least one of the following locations: on, in or near the front substrate and as an interlayer between the front substrate and the back component. However, the display does not comprise only a single patterned layer as the rearmost layer of the display. The display may include a back substrate which is below the rearmost layer of liquid crystal material. The patterned layer could be located, for example, at one or more locations near the front substrate, at an interlayer between the front substrate and the back substrate, and at an interlayer between the front substrate and the back component which can be disposed behind the back substrate if a back substrate is used. The back substrate and/or the patterned layer is opaque or semitransparent. Electronic circuitry applies a voltage to the conductive layers that enables at least one of erasing or writing of the active layer. For example, the electronic circuitry applies a voltage to the conductive layers that places the active layer in a bright state, a dark state, a grey scale state or the state caused by applying a write voltage Vw to a writing tablet as discussed below. The active layer and the patterned layer cooperate to produce an image on the display.

Referring to more specific features of the first aspect of this disclosure, any of the information discussed in the Detailed Description can be combined with the first aspect in any combination. Further, the voltage can be applied as one or more voltage pulses or as a continuous voltage. A portion of or an entire area of the electrically conductive layers can be patterned into a passive matrix. The passive matrix can comprise one of the electrically conductive layers forming rows of substantially parallel electrode lines on one side of the active layer and another of the electrically conductive layers forming columns of substantially parallel electrode lines on the other side of the active layer, wherein the columns are substantially orthogonal to the rows. The back component can comprise an opaque light absorbing layer which, for example, is positioned behind the back substrate if one is used. A color of the at least one active layer can be selected so as to change an appearance of all or a portion of the ink of the at least one patterned layer. The display can be in the form of a writing tablet. The display can include the patterned layer on, in or near the front substrate and as an interlayer between the back component and the front substrate, such as upstream of the back substrate which is opaque or semitransparent, with a single liquid crystal layer or multiple liquid crystal layers.

As another specific feature of the first aspect, the display can include at least two or three of the active layers stacked on top of each other. Each of the active layers is comprised of cholesteric liquid crystal material, wherein each of the active layers is disposed between two adjacent electrically conductive layers. The display can include three of the active layers reflecting red, green and blue, in any order.

As a specific feature of the first aspect, there can be the back substrate at a back of the display, wherein the back component includes a back pattern disposed behind the back substrate, the electrically conductive layers being disposed between the front substrate and the back substrate. The back substrate is transparent or semitransparent and the patterned layer, the active layer, possibly the back substrate, and the back pattern form the image on the display. The back pattern can be removable and is selected from the group consisting of a template of a sports field, court or arena, a pattern for a children's game, an image for children to color, notepad lines, graph paper lines, or a menu of items that one can choose from. The back component can comprise an emissive, backlit or reflective display device for displaying images that form the back pattern.

Yet another specific feature of the first aspect is that the display is in the form of a decorative electronic skin. An article includes the electronic skin and is selected from the group consisting of cell phone, laptop, computer, computer monitor, computer mouse, computer keyboard, television, I-pod, MP3 player, PDA, video game controller, stereo, radio, CD player, appliance, toy, headphones, clock, handheld electronic devices, key ring accessory, shoe, purse, backpack, briefcase, computer case, computer covering, jewelry, watch, bottle, bottle lid, clothing, clothing embellishment, furniture, furniture embellishment, mobile entertainment case and combinations thereof.

A second aspect of the disclosure features a writing tablet including electrically conductive layers. At least one active layer is disposed in a gap between adjacent electrically conductive layers, the active layer including bistable cholesteric liquid crystal material. A front substrate comprised of flexible transparent material forms a writing surface. The electrically conductive layers are disposed behind the front substrate. A back component is disposed at a back of the display below the active layer. The active layer is adapted to enable writing pressure applied to the writing surface to reduce a thickness of the gap to form a reduced gap region in which the liquid crystal is light reflecting so as to reflect light of a color or is essentially transparent, a texture of the liquid crystal being unchanged in a non-reduced gap region. At least one patterned layer is disposed at at least one of the following locations: on, in or near the front substrate and as an interlayer between the front substrate and the back component, the patterned layer being opaque or semitransparent. Electronic circuitry applies a voltage to the conductive layers that enables at least one of erasing or writing of the active layer. The active layer and the patterned layer cooperate to produce an image on the display.

Any of the specific features discussed above in connection with the first aspect, and any information discussed in the Detailed Description, apply to this second aspect in any combination. Further, the electronic circuitry can apply an erasing voltage to the conductive layers for the active layer, wherein the erasing voltage enables the liquid crystal of the active layer to be placed in the light reflecting texture or in the substantially transparent focal conic texture. Moreover, the electronic circuitry can apply a writing voltage to the electrically conductive layers. The writing pressure is applied while applying the writing voltage effective to place the reduced gap region of the active layer in the essentially transparent focal conic texture while not changing the texture of an unreduced gap region of the active layer.

Referring to a third aspect of this disclosure a multicolor writing tablet includes electrically conductive layers. There are at least two or three active layers stacked over each other each disposed in a gap between adjacent conductive layers. The active layers include bistable cholesteric liquid crystal material. A front substrate of flexible transparent material forms a writing surface. A back component is disposed at a back of the display below the active layers. The active layers are adapted to enable writing pressure applied to the writing surface to reduce thickness of the gaps to form reduced gap regions. At least one patterned layer is disposed at at least one of the following locations: on, in or near the front substrate and between the front substrate and the back component. The patterned layer is opaque or semitransparent. Electronic circuitry applies erasing and writing voltages to the conductive layers for each of the active layers. The erasing voltage enables the liquid crystal of the active layer to be placed in a light reflecting texture so as to reflect light of a color or enables the liquid crystal of the active layer to be placed in an essentially transparent focal conic texture. The writing voltage enables writing in a color that is selected from any of the active layers by applying the writing voltage to the conductive layers for a non-selected active layer while applying the writing pressure to the writing surface, enabling the reduced gap region of the non-selected active layer to be in the substantially transparent focal conic texture and by not applying the writing voltage to the conductive layers for the selected active layer while applying the writing pressure to the writing surface, enabling the reduced gap region of the selected active layer to reflect the color of the selected active layer. The active layers and the patterned layer cooperate to produce an image on the display.

Many additional features, advantages and a fuller understanding of the invention will be had from the accompanying drawings and the Detailed Description that follows. It should be understood that the above Brief Description describes the invention in broad terms while the following Detailed Description describes the invention more narrowly and presents specific embodiments that should not be construed as necessary limitations of the broad invention as defined in the claims.

BRIEF DESCRIPTION OF THE DRAWINGS

FIGS. 1A-B: Illustrations showing the components of a commercially available flexible cholesteric liquid crystal writing tablet, the Boogie Board® of the prior art.

FIG. 3: Shows an illustration of the electronic skin display of FIG. 2 with patterned images in two different layers of the display stack. There are two active ChLC layers and four possible images. Due to the patterned ink included in the display stack these four images have a very distinct look from one another.

FIGS. 6A-C: Illustrations of a semitransparent writing tablet with a digital display behind a patterned ink image. The digital display allows patterned lines to either appear or be invisible to the user.

FIG. 10 A-C are perspective, side and top views, respectively, of an electronic display of this disclosure in which a removable back pattern is shown being positioned at a back of the display.

DETAILED DESCRIPTION

Figure 2A:
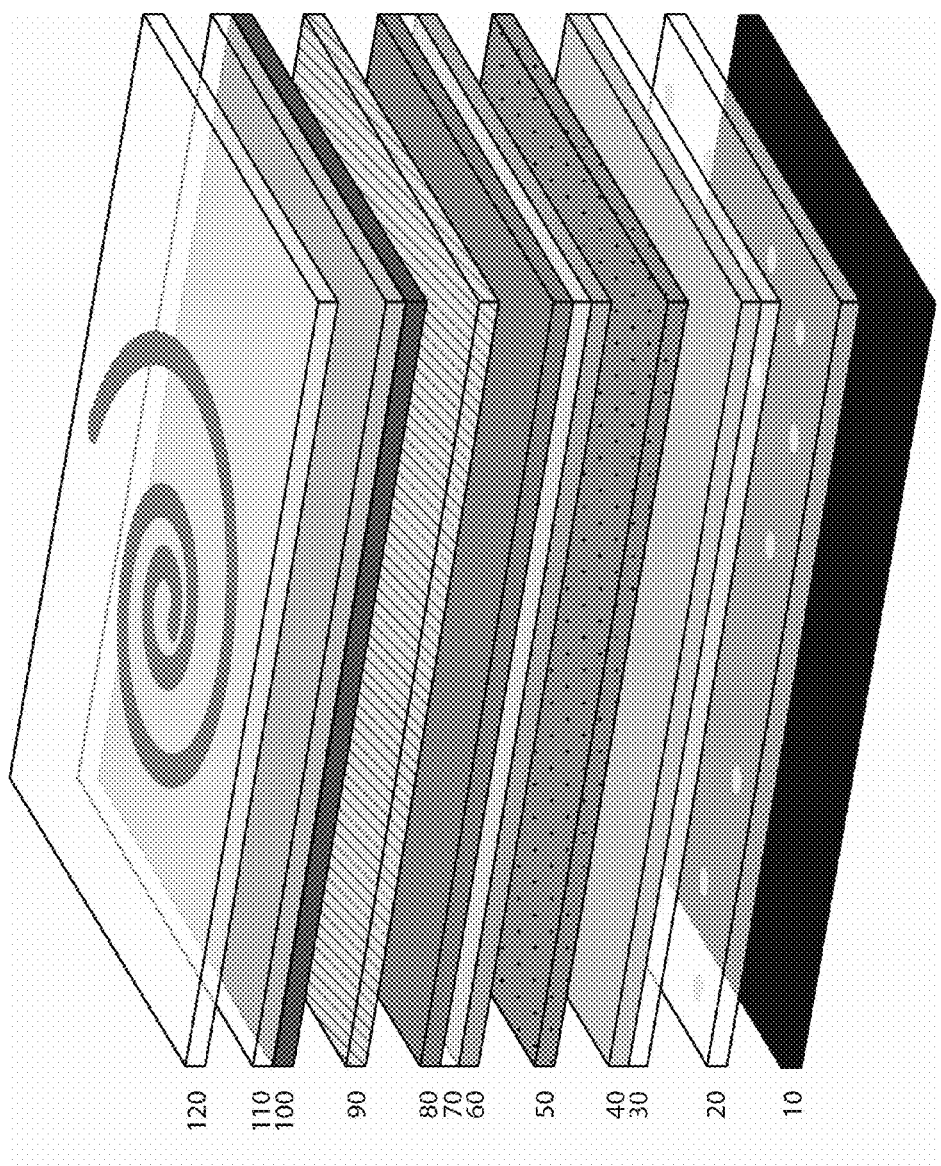
FIG. 2A: Cross-section of an electronic skin display with patterned ink on multiple layers. There are two active display layers; a red CHLC layer (50) and a green CHLC layer (90) and three ink layers.
Figure 2B:
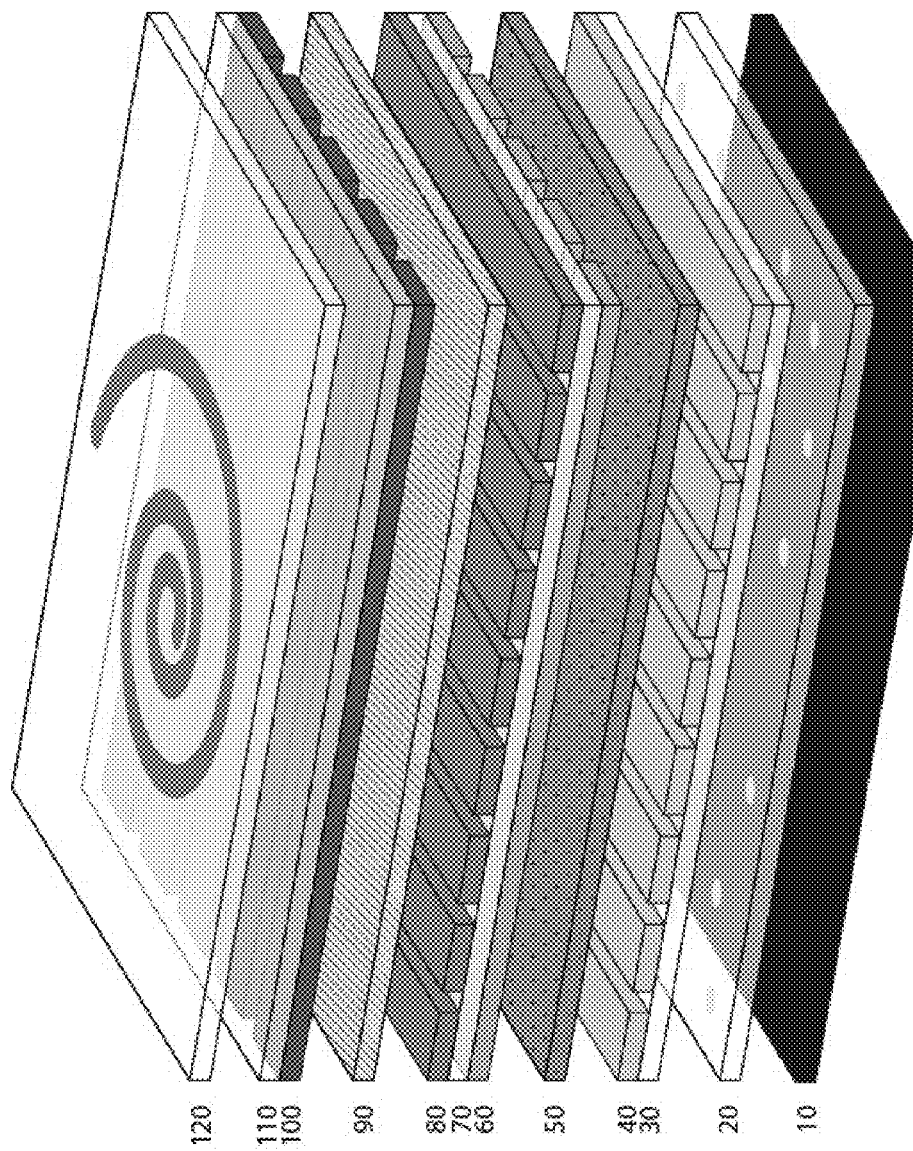
FIG. 2B: A perspective view of the electronic display device of the disclosure wherein one of the electrically conductive layers is in the form of rows and the other of the electrically conductive layers is in the form of columns, the rows and columns being orthogonal to each other, to form a passive matrix display.

We disclose here a display that displays an image from a patterned ink layer forming a design on the display. The patterned ink layer can be located on, in or near one or more of the front substrate, the back substrate, or interlayers of the display between the front and back substrates or between the front substrate and the back component. The colors of the patterned ink design mix with the display colors creating different images depending on the color the display is switched to.

Reflex® displays are built using a roll to roll process on a manufacturing line at Kent Displays Inc. The displays are fabricated using the Polymerization Induced Phase Separation (PIPS) process and can either create an encapsulated active layer, where the ChLC forms droplets surrounded by a polymer shell, or a writable active layer, where the polymer forms pillars for the ChLC to flow around during writing. The patterned images are created by screen printing ink onto the one or more of the various display layers as desired. The ink can be either opaque or semitransparent. The roll to roll manufacturing process can accommodate multiple layers of patterned and continuous coated inks. The homogeneity of the coating of the ink can affect the final appearance of the display as variations in ink thickness can change the observed display color. Since there is color mixing of the ink and ChLC layers, the initial choice of ink colors, their transparency and patterns can add to the desired effect for patterned ink color mixing with the ChLC layers. Final display processing steps include singulation and interconnecting the display to electronics.

In a traditional cholesteric display of the prior art such as the Boogie Board® writing tablet, a fixed, black opaque light absorbing ink is disposed on the back of the display to enhance its contrast. Referred to as the display background, it is typically made by painting the backside of the lower substrate. Referring to FIG. 1, this continuous ink coating 1 is placed on the bottom transparent plastic substrate 2, which is coated on the other side with a transparent conductive layer 3. The remainder of the display includes a layer 4 of a cured dispersion of liquid crystal, polymer and spacers, and another transparent top substrate 6 coated with a transparent conductor 5. The bottom and top substrates are extended to create the bottom ledge 7 and top ledge 8, respectively. The transparent conductors 3 and 5 are exposed on ledges 7 and 8, respectively, for connecting to drive electronics so that a voltage or voltage pulses may be applied across electrodes 3 and 5 as is used to initialize or erase an image or operate the display in Mode A, Mode B or select erase as described in U.S. Patent Application Publications 2009/0033811 and 2009/0096942, which are incorporated herein by reference in their entireties.

Complex images can be created using the patterned layer coating by matching the color of the ChLC and ink of the patterned layer. The display used to demonstrate complex images is an electronic skin with two cholesteric liquid crystal layers and three ink coating patterned layers. The electronic skin display in FIG. 2A has a continuous ink coating 10 over a patterned ink coating 20 on the bottom transparent plastic substrate 30, which has a transparent conductive coating on the opposite side 40. Above the first substrate is a first layer of cured dispersion of liquid crystal (tuned to reflect red light), polymer and spacers 50 with a second transparent plastic substrate 70 above layer 50. Plastic substrate 70 has transparent conductive coatings (60 and 80) on both sides of the substrate. Above plastic substrate 70 is a second layer of cured dispersion of liquid crystal (tuned to reflect green light), polymer and spacers 90 with a third transparent plastic substrate 110 above layer 90. Plastic substrate 110 has a transparent conductive coating 100 close to the liquid crystal layer and it has a patterned ink coating 120 on the opposite side. Of course, the particular pattern on the patterned layers of this display shown in FIG. 2A can be changed while keeping the location of the patterned layers the same (or different), the display images shown in FIG. 4 being from this FIG. 2A display with different patterns but same patterned layer positions.

Figure 2C:
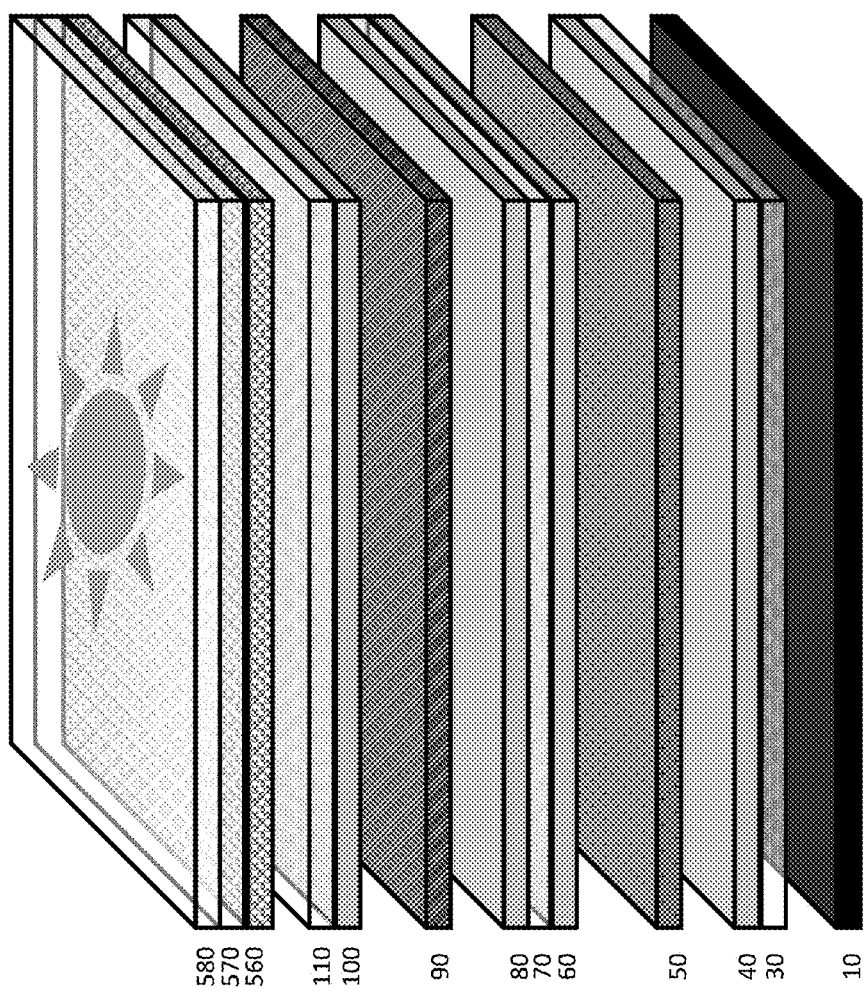
FIG. 2C: Cross-section of an electronic skin display with patterned ink on separate plastic film attached to the top of the display. There are two active display layers; a red CHLC layer (50) and a green CHLC layer (90) and two ink layers.

The electronic skin display in FIG. 2C has a continuous ink coating 10 over the bottom transparent plastic substrate 30, which has a transparent conductive coating 40 on the opposite side. Above the first substrate is a first layer 50 including a cured dispersion of liquid crystal (tuned to reflect red light), polymer and spacers with a second transparent plastic substrate 70 above layer 50. Plastic substrate 70 has transparent conductive coatings (60 and 80) on both sides of the substrate. Above plastic substrate 70 is a second layer 90 including a cured dispersion of liquid crystal (tuned to reflect green light), polymer and spacers with a third transparent plastic substrate 110 above layer 90. The plastic substrate 110 has a transparent conductive coating 100 close to the liquid crystal layer 90. There is a plastic film 570 with patterned ink 580 over top of the display and attached to the display with optically clear adhesive 560. The particular pattern on the patterned layers of this display shown in FIG. 2C can be changed.

Figure 2D:
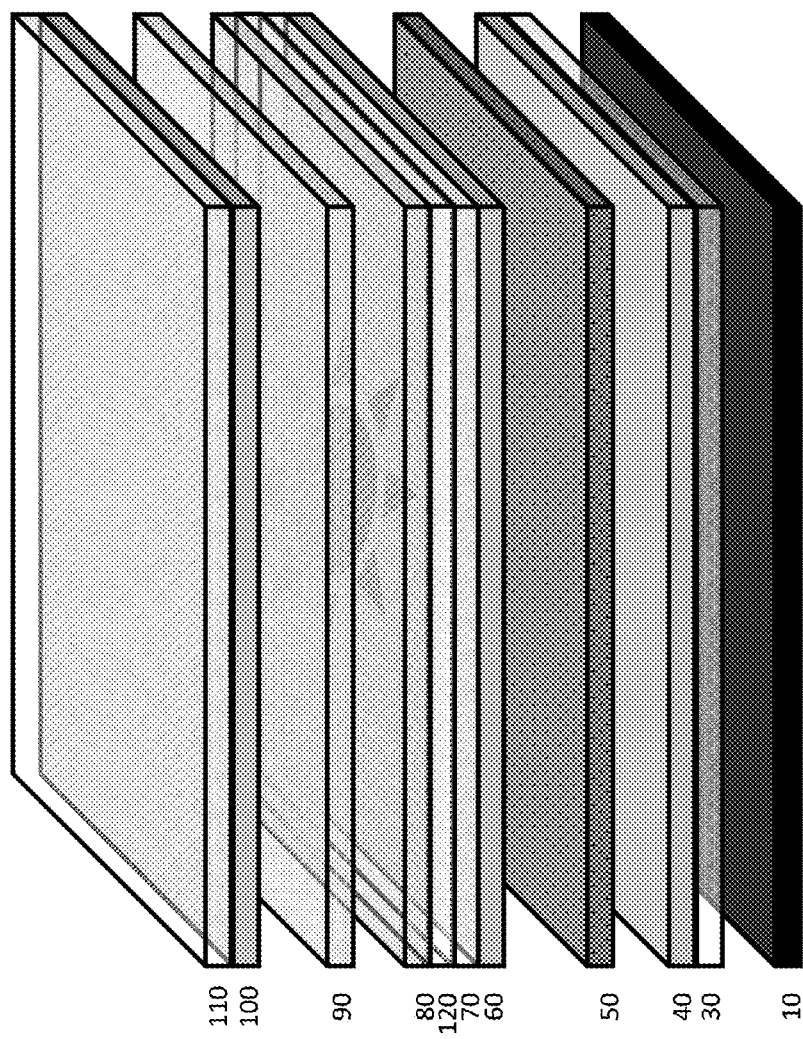
FIG. 2D: Cross-section of an electronic skin display with patterned ink on one of the interior layers of the display. There are two active display layers; a red CHLC layer (50) and a green CHLC layer (90) and two ink layers.

The electronic skin display in FIG. 2D has a continuous ink coating 10 over the bottom transparent plastic substrate 30, which has a transparent conductive coating 40 on the opposite side. Above the first substrate is a first layer 50 including a cured dispersion of liquid crystal (tuned to reflect red light), polymer and spacers with a second transparent plastic substrate 70 above layer 50. Plastic substrate 70 has transparent conductive coatings (60 and 80) on both sides of the substrate. Coated or printed over second transparent plastic substrate 70 between the substrate and the transparent conductive coating 80 is a patterned ink layer 120 where the transparent conductive coating 80 is coated over the patterned ink layer 120. Above plastic substrate 70 is a second layer 90 including a cured dispersion of liquid crystal (tuned to reflect green light), polymer and spacers with a third transparent plastic substrate 110 above the layer 90. The substrate 110 has a transparent conductive coating 100 close to the liquid crystal layer 90. The particular pattern on the patterned layers of this display shown in FIG. 2D can be changed. This arrangement could be flipped so that the patterned layer 120 is formed on the inside of the upper substrate 110 and covered with conductor 100.

This display can create a so called "hidden image", which can be seen in FIG. 3 with the color matching image 130. In producing the color matching image only one of the two cholesteric liquid crystal layers is in the planar texture. The image appears to change as the display switches, due to color mixing between the patterned ink layers and the display colors. The display with both layers in the focal conic texture is shown as 132. The display with both layers in the planar texture is shown as 134. The display with only the second cholesteric liquid crystal layer in the planar texture is 136. The "hidden image" effect has been shown in other display types, such as electrophoretic, on the market but is unique to cholesteric displays. In addition, the image shape can appear to change based on how well the patterned inks blend with some of the display colors (see FIG. 4 below).

Figure 4:
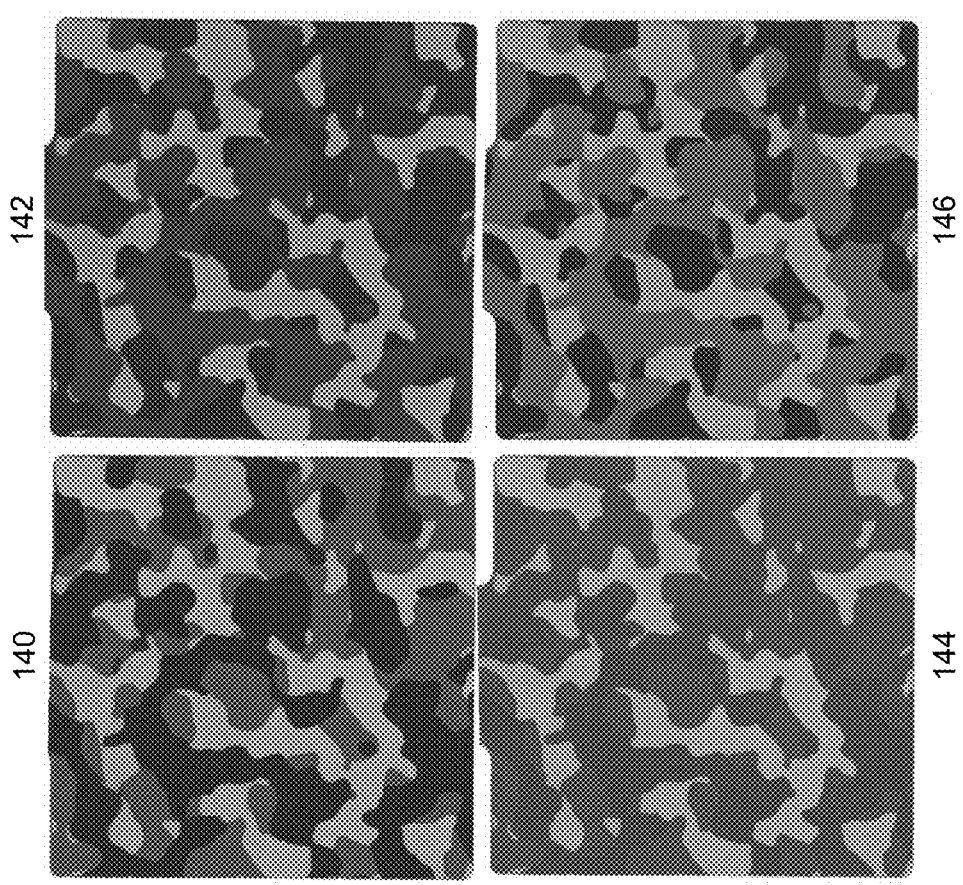
FIG. 4: Shows a photo of an electronic skin display shown in FIG. 2 having different patterns on the patterned layers than in FIG. 2 in two different layers of the display stack. There are two active ChLC layers and four possible images. Due to the patterned ink included in the display stack these four images have a very distinct look from one another.

A second example of a two layer display with patterned ink is shown in FIG. 4. In photo 144 the brown ink at the front of the display approximately matches the second ChLC (cholesteric liquid crystal) layer, which is a red CHLC, in the planar texture almost creating a "hidden image." Photo 140 shows both ChLC layers in the focal conic texture clearly demonstrating the tan, brown, and black colors of the ink. Photo 142 shows the first ChLC layer, which is a green ChLC layer, in the planar texture. Photo 146 shows both ChLC layers in the planar texture. The patterned ink on the various layers of the display as shown in FIG. 2A give the display a very unique, visually changing appearance and allow for much more image appeal even though the display only has one electrical pixel and the patterned ink layers are fixed in color and pattern.

Figure 5:
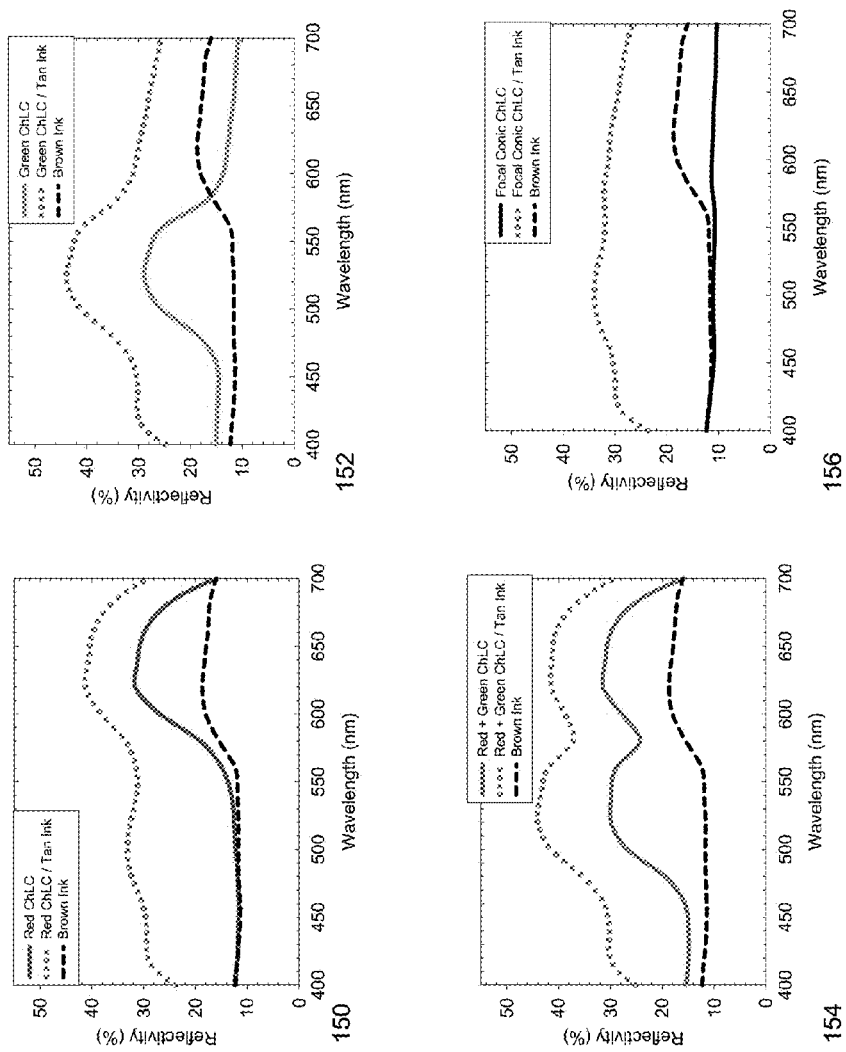
FIG. 5: Reflection spectra for the display shown in FIG. 2.

The exact color of the final display is a combination of the additive reflective colors of the ChLC layers and the subtractive reflective colors of the ink layers. Defining what the colors of the ChLC and ink layers should be prior to building the display requires careful consideration of the reflection spectra of each layer. The reflection spectra of each color for all the images are shown in FIG. 5. This reflection spectra is for the display having the ChLC and ink colors shown in FIG. 4. The spectra 150 for a display with red ChLC layer in the planar texture and a green ChLC layer in the focal conic texture is shown. In addition, the reflection spectra 152 for a display with the green ChLC layer in the planar texture and the red ChLC layer in the focal conic texture is shown. Also, two additional reflection spectra are shown where the display has both the red and green ChLC layers in the planar texture (spectra 154) and the display with both the red and green ChLC layers in the focal conic texture (spectra 156).

Notice that a combination of the tan ink spectra and all the ChLC colors results in the combination spectra of Red ChLC/Tan Ink, Green ChLC/Tan Ink, and Yellow ChLC/Tan Ink. Also, the exact color of the Brown Ink matches the Red ChLC closely which allows the image shape to fade away when the Red ChLC is in the planar texture.

Another embodiment of a patterned ink layer within the display layers includes a writing tablet display with an electronic skin providing the background color with a patterned ink layer between the two display layers, the electronic skin being disclosed in E. Montbach, et al., "Flexible Electronic Skin Display," *SID Symposium Digest*, Vol. 40, pg. 16, 2009, which is incorporated herein by reference in its entirety. In this embodiment, the continuous ink coating 1 in FIG. 1, is replaced by a patterned ink layer. An electronic skin is used as a back component of the display. FIG. 6 illustrates this embodiment in which an electronic skin 170 as described in the Montbach et al. paper, is the display layer farthest from the viewer. Over top of the electronic skin is a patterned ink layer 180 that allows portions of the electronic skin to be seen by the viewer. This patterned ink layer can be formed of opaque or semitransparent material. Over top of the patterned ink layer is the writing tablet display 190 including: a bottom transparent substrate 200 that is coated with conducting polymer 210, a top transparent substrate 240 that is coated with conducting polymer 230 and a cured dispersion of liquid crystal, polymer and spacers 220. A patterned ink layer is shown as 255 in FIGS. 6A, C. The patterned ink layer is on the front of the display and can allow the display to have different display colors due to the color mixing of the patterned ink and the ChLC. The ink can be semitransparent or opaque. This display has ledges such as the display in FIG. 1. It should be appreciated that throughout this disclosure when reference is made to one layer or component being coated with another layer, the coating steps could be performed in any order, including a reverse order from what is described and that layers or components can be coated before being inserted into the stack of layers. When the electronic skin is in the focal conic texture, the continuous coated ink behind the electronic skin matches the ink on the patterned ink layer 180 and the device can be used as an unpatterned writing tablet. When the electronic skin 170 is in the planar texture, portions of the electronic skin 170 planar state are seen through the patterned ink 180 and the writing tablet device can be used with a patterned (e.g., wavy line) template, in the particular patterned image shown in FIG. 6(c).

The following sections of the specification, excluding the examples, have been excerpted and modified from U.S. patent application Ser. No. 12/152,729, entitled "Multiple Color Writing Tablet," now U.S. Pat. No. 8,228,301, which is incorporated herein by reference in its entirety. The main modification is to employ at least one of the patterned ink layers in the writing tablet. Also, the fixed light absorbing layer of the '729 patent application can be replaced by a semitransparent back layer and an optional patterned layer can be employed behind the semitransparent layer as disclosed in the patent application entitled "Electronic Display with Semitransparent Back Layer," U.S. patent application Ser. No. 13/477,638, which is incorporated herein by reference in its entirety.

Figure 7:
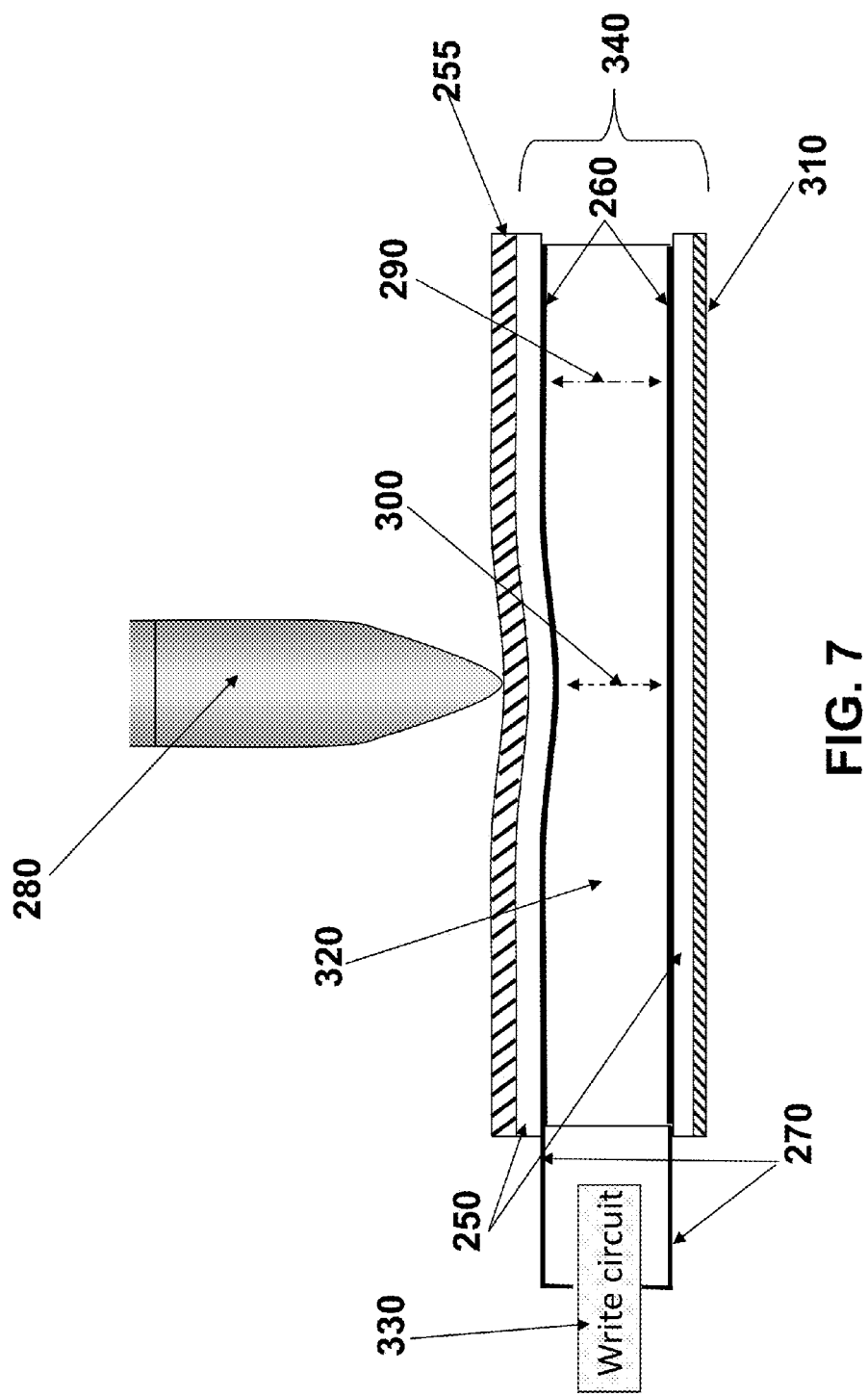
FIG. 7: Illustration of a writing tablet cell with patterned ink on the front.

Cell Having Focal Conic Written Portion on Planar Background:

Another embodiment of this disclosure is a writing tablet in which the background state is the planar texture and the line created by the pressure of the stylus is in the focal conic texture. The bistable cholesteric writing tablet is illustrated in FIG. 7 and includes substrates 250 of transparent, flexible material in which plastic is preferred. The inner surface of the substrates are coated with transparent conductive electrodes 260 from materials such an indium tin oxide (ITO) or a conducting polymer such as PEDOT. Sandwiched between the adjacent electrodes is a bistable cholesteric material 320.

In FIG. 7, all of the electrodes and substrates are transparent, except for the electrode and any substrate nearest to the light absorbing back layer (e.g., lower electrode 260 and lower substrate 250), which can be transparent or opaque.

In this embodiment in which the liquid crystal is initially in the planar texture, flow of the liquid crystal is not required for the inventive cell to form the focal conic texture using the pressure of a stylus. The droplets can be confined as separate droplets within the dispersion or the droplets can be unconfined with interconnecting droplets. The dispersions may be of the type prepared by water borne emulsions or by polymerization induced phase separation (PIPS) as is known in the art. The image is created by the unique electro-optic characteristics of the cell rather than by flow to be described later. The conducting electrodes 260 are connected with electrical interconnects 270 to electronic write (and erase) circuitry 330 that provides suitable voltages to the conducting electrodes 260, usually in the form of a pulse, in order for pressure of the stylus to create an image.

Figure 8:
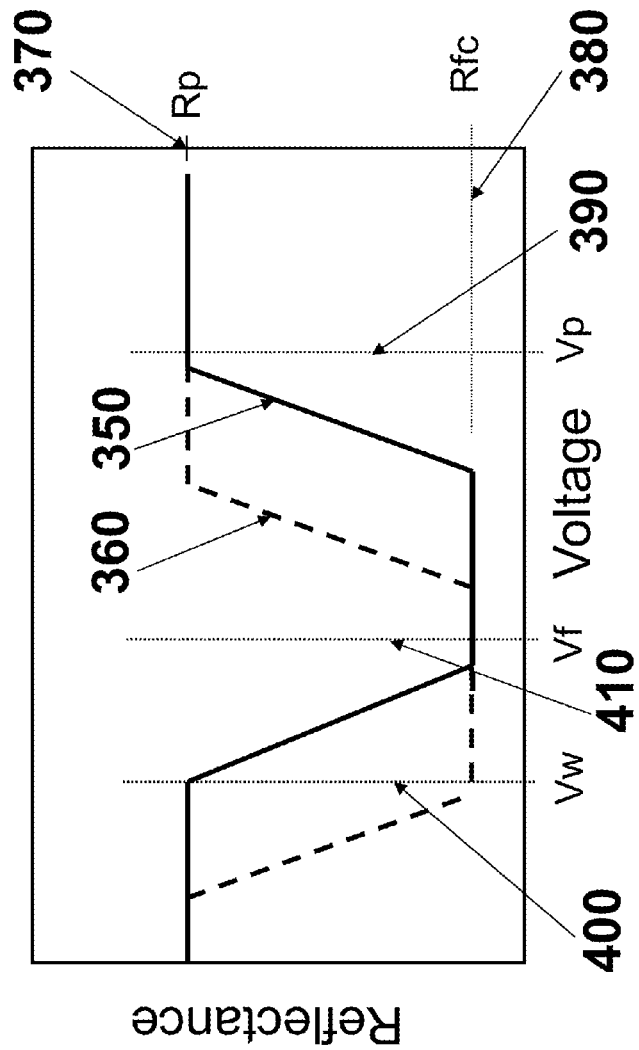
FIG. 8: Illustration of the voltage response curves used in describing the invention (with voltage increasing toward the right of the figure and reflectance increasing toward the top of the figure).

In order to explain the function of the writing circuitry 330 of FIG. 7 we turn to FIG. 8. FIG. 8 is an illustration of the typical and hypothetical voltage response shown as the Reflectance of the cell versus the Voltage of a pulse applied to the cell. There are two curves illustrated in the voltage response of FIG. 8: a solid curve 350 for the cell with an undepressed cell gap 290 and a dashed curve 360 for a reduced cell gap spacing 300 (the depressed and reduced cell gaps being shown in FIG. 7). In both the solid 350 and the dashed 360 curves of FIG. 8, the maximum light reflectance of the planar texture is indicated by Rp 370 whereas the minimum light reflectance of the focal conic texture is indicated by Rfc 380. As illustrated in FIG. 8 the effect of the pressure from the stylus is to shift the voltage response from the solid curve 350 to the dashed curve 360.

The procedure of writing an image on the inventive cell is to first erase all previous images by applying an erasing voltage of value Vp indicated by vertical line 390 to drive the cell initially to the planar texture. The value of the voltage or magnitude of a voltage pulse to do this is well known in the art of a bistable cholesteric liquid crystal displays; e.g., U.S. Pat. Nos. 5,453,863 and 5,691,795, which are incorporated herein by reference in their entireties. This erases the writing tablet to the reflective planar texture so that the background color of the writing tablet is a color additive mixture of the reflective color of the cholesteric material 320 with the color of the back layer 310 of FIG. 7.

In order to write an image using stylus 280 a voltage, Vw, is applied by the write circuit 330. The value of Vw is indicated by vertical line 400 of FIG. 8. The voltage is applied for the duration of the stylus write; preferably a continuous AC voltage or a sequence of bipolar pulses. The voltage is applied to the patterned or unpatterned electrodes so that the entire display area of liquid crystal seen by the user of the writing tablet, has an electric field applied to it. It is seen by curve 360 in FIG. 8 that a voltage Vw 400 will drive that area of the cell to the focal conic texture; that is, areas of the cell under the stylus where pressure is applied and cell gap is reduced. The planar texture in that area is driven to the focal conic texture as illustrated by the dashed curve 360. In the remainder of the cell where the cell gap is not disturbed, even though the electric field has been applied here, the material will remain in the planar texture as indicated by the solid curve 350, leaving a planar background for the focal conic writing. In other words, the liquid crystal material where the cell gap is undisturbed remains in the planar texture as shown where line Vw intersects the solid line 350 (undepressed cell gap) while the voltage Vw is applied to the electrodes and is not converted to the focal conic texture. The write circuit 330 can also provide an erasing voltage Vp to erase the entire tablet. It is seen by FIG. 8 that a voltage Vp 390 will drive the entire cell to the planar texture, erasing the focal conic writing. The voltage may be an AC voltage pulse or a sequence of pulses, preferably bipolar pulses.

The patterned ink layer is shown as 255 in FIG. 7. The patterned ink is on the front of the display and can allow the display to have new display colors due to the color mixing of the patterned ink and the ChLC. The ink can be semitransparent or opaque.

References to writing "on a background" used in this disclosure means writing a black or color line on the writing tablet in which a majority of the display area has the background color or is black, and does not mean that the background must be physically behind the writing or formed by a color of the light absorbing back layer. When the word "image" is used in this disclosure it means any black or color line and any black or color background on the writing tablet, together with the design or pattern of the patterned layer. When we say "selecting a cell" or "writing on a cell" in this disclosure, that means selecting the writing color to include the color reflected by that cell. It will be appreciated as described above that the color of the display background and writing will be affected by the color and design of the ink of the patterned layer as described above.

Figure 9A:
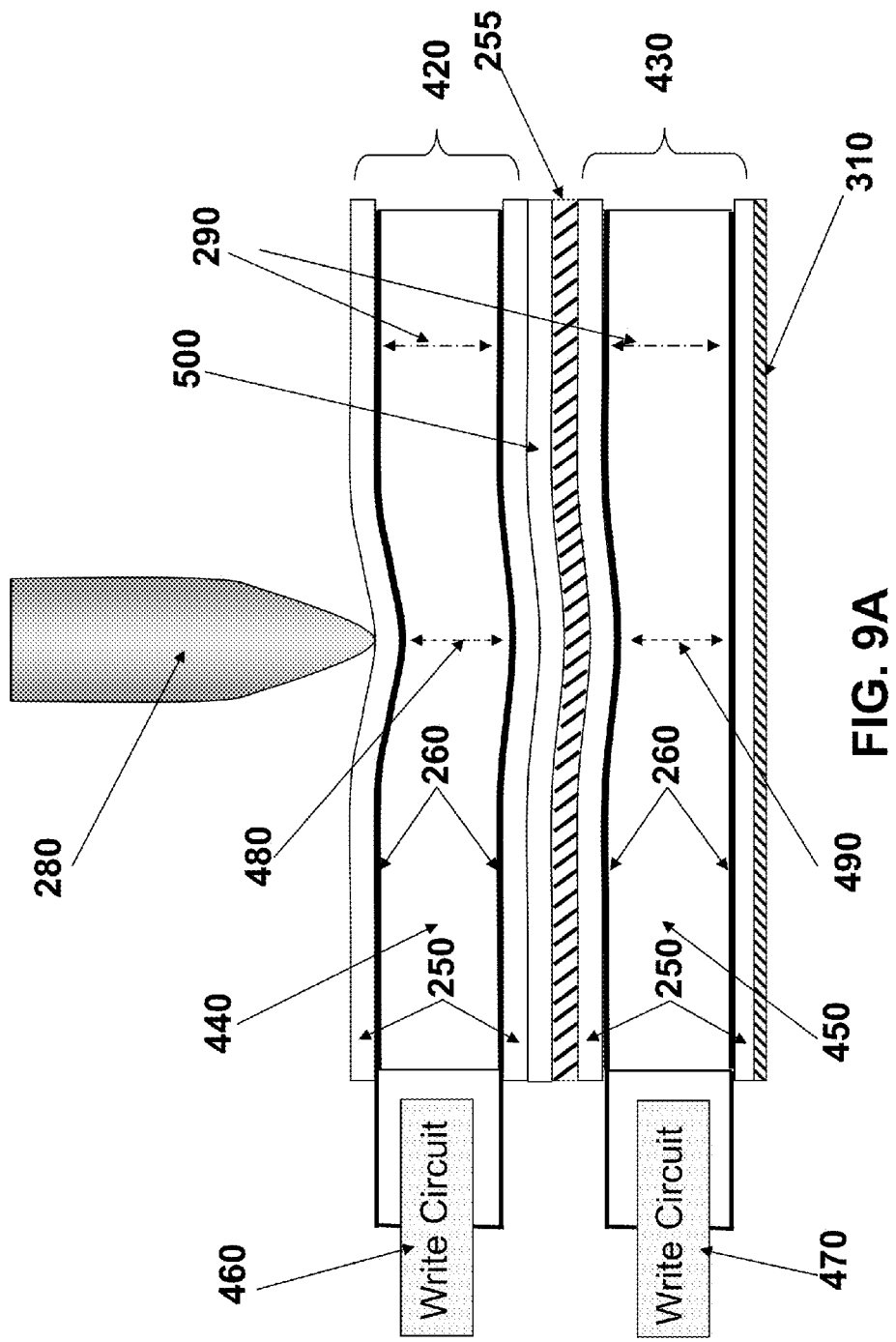
FIG. 9A: Schematic illustration of a double stack multicolor writing tablet with patterned ink between the display layers.

II. Double Cell Writing Tablet:

We now turn to a second embodiment of the invention featuring a multiple-color tablet in which two active layers are stacked over each other (FIG. 9). The active layers can be stacked such that each cell reflects a different planar reflective color and images can be written separately on each cell with a single stylus to create multiple color images on the writing tablet. The cholesteric material of the cells each has a pitch length selected to reflect any color; preferably the colors reflected by the two cells are different than each other. Primary such reflective colors can be mixed to create a variety of colors subject to the innovation of the user. The writing tablet enables a single untethered stylus to write or draw figures in different colors as selected by the user. Writing of different colors can be achieved in at least two ways: a first Mode A in which planar texture color writing is presented on a planar texture background; and a second Mode B in which planar texture color writing is presented on a focal conic background, preferably black. Each of these modes works on a different physical principle of the cholesteric liquid crystal and will be described separately below.

The double cell writing tablet device can be made with either stacked separate cells or as a single unit sharing substrates. The word "cell" as used herein means an active layer, the electrodes on either side of it, and any substrates flanking the electrodes (i.e., on either side of the electrodes). In FIG. 9, completed cells 420 and 430 comprising different color active layers can be stacked as separate units each having separate substrate 250 with an electrode 260 on an inside surface of it, the internal substrates 250 being joined with an index matching material 500 in between them and a patterned ink layer 255.

IIa. Double Cell Writing Tablet in Mode A:

In describing Mode A, we refer to FIG. 9 which is an illustration of a writing tablet having double stack cells. The multiple-color double-stack tablet of FIG. 9 is made up of two cells, cell 420 stacked on top of cell 430. Cell 420 is of the same construction as cell 340 of FIG. 7 containing transparent substrates 250 with transparent conducting electrodes 260, connected to a writing circuit 330; however the background coating 310 is absent. Cell 420 is stacked on top as well as optically coupled to cell 430 so as to match the index of refraction of adjacent substrates. One means of optical coupling is with a thin layer of optical index matching fluid between cells 420 and 430. Cell 430 is also identical in construction to cell 340 of FIG. 7 with transparent substrates 250 and transparent conducting electrodes 260 that are electrically connected to writing circuit 330 as well as containing background coating 310.

Cells 420 and 430 are filled with a cholesteric liquid crystal material 440 and 450, respectively. However, the cholesteric material within each cell has a different reflective color than the other cell. For example, 420 may be a cholesteric material that reflects blue light while 430 is a cholesteric material that reflects yellow light. In certain applications it may be desired that materials 440 and 450 have a different handedness for the helical twist; that is, one cell reflects right handed circular polarization and the other left. Like the cholesteric material 320 of FIG. 7, the cholesteric materials 440 and 450 of FIG. 9 are preferred to be in the form of a polymeric dispersion. The droplets can be confined as separate droplets within the dispersion since flow of the liquid crystal is not required for this embodiment of the multiple color writing tablet. Materials 440 and 450, however, may also be a droplet dispersion in which the droplets are unconfined with interconnecting droplets since flow will not affect its operation. The dispersions may be of the type prepared by water borne emulsions or by polymerization induced phase separation as is known in the art.

A procedure of writing a multicolor image on the double stack tablet in Mode A is to first erase all previous images by activating both write circuits 460 and 470 to apply voltages of value Vp indicated by vertical line 390 (FIG. 8) to drive both cells 420 and 430 into the planar texture. The value of the voltage or magnitude of a voltage pulse to do this is well known in the art of a bistable cholesteric liquid crystal displays; e.g., U.S. Pat. Nos. 5,453,863 and 5,691,795. This erases the multi-color writing tablet to the reflective planar texture so that the background color of the writing tablet is a color additive mixture of the reflective colors of the cholesteric materials 420 and 430 and any color of the back layer 310.

In order to write an image of the color of the cholesteric 440 on the top cell 420 by stylus 280 in Mode A, a voltage Vw must be applied by the write circuit 470 of the bottom cell 430 during the writing process. The value of Vw is indicated by vertical line 400 of FIG. 8. The voltage is applied for the duration of the stylus write; preferably a continuous AC voltage or a sequence of bipolar pulses. It is seen by curve 360 of FIG. 8 that a voltage Vw 400 will drive the bottom cell to the focal conic texture only in the vicinity of the stylus where pressure is applied and the cell gap is reduced. This removes the planar texture of the liquid crystal 450 in the bottom cell 430 under the stylus (i.e., in reduced gap regions). In the remainder of the bottom cell 430 where the cell gap is not disturbed, the material will remain in the planar texture as indicated by the solid curve 350. Because no voltage is applied to the electrodes for the upper cell 420, the liquid crystal 440 of the upper cell is not changed from the planar texture. This forms an image composed of a written portion (region where pressure is applied by the stylus to the writing surface) containing only the reflected light of the color of the cholesteric 440 of top cell 420 (added with any color of the back layer, referred to as a "back color") on a background color (formed by the undepressed (unwritten) regions of both cells) that is an additive mixture of the colors of the planar textures of both cells (along with any back color) in cooperation with the design or pattern of the patterned layer.

The patterned ink creates a color image using subtractive color, where the ink layer absorbs the portion of the visible spectra not desired in that portion of the image. For instance, red ink would absorb the blue and green portions of the visible spectra allowing the red portion of the spectra to be transmitted through the ink. Whereas the ChLC reflects light with additive color, where the ChLC layer directly reflects the color seen by the viewer. For instance, a red ChLC layer reflects only the red portion of the visible spectra. When the patterned ink layer is above the ChLC layer there is color mixing between the ink layer and the ChLC layer. This occurs when the ink layer absorbs a portion of the visible spectra, only allowing a particular group of wavelengths to reach the ChLC, then the ChLC further down selects the wavelengths of light that are reflected back to the viewer.

In order to write an image of the color of the cholesteric 450 on the bottom cell 430 by stylus 280 in Mode A, a voltage Vw is applied by the write circuit 460 to the top cell 420 while the writing pressure is applied to the writing surface. The value of Vw is indicated by vertical line 400 of FIG. 8. The voltage is applied for the duration of the stylus write; preferably a continuous AC voltage or a sequence of bipolar pulses. It is seen by curve 360 of FIG. 8 that a voltage Vw 400 will drive the cholesteric 440 of the top cell 420 to the focal conic texture in the vicinity of the stylus where pressure is applied (i.e., at the written portion of the writing tablet) as the cell gap is reduced. In the remainder of the top cell where the cell gap is not disturbed, the material will remain in the planar texture as indicated by the solid curve 350. Therefore, the image will be composed of the written portion formed by colored light reflected from the planar texture of the cholesteric 450 of only the bottom cell 430 (added to any color of the back layer) in cooperation with the pattern or design of the patterned layer. The written portion will be apparent on a background color (formed by the undepressed regions of both cells) that is an additive mixture of the colors of the planar textures of both cells (along with any background color) in cooperation with the design or pattern of the patterned layer.

In Mode A, the write circuits 460 and 470 can be used to erase the tablet by providing a voltage Vp to each of cells 420 and 430. It is seen by FIG. 8 that a voltage Vp 390 will drive each of the cells entirely to the planar texture. The voltage may be an AC voltage pulse or a sequence of pulses, preferably bipolar pulses.

IIb. Double Cell Writing Tablet in Mode B

In describing Mode B, we again refer to FIG. 9. The writing tablet is identical to that described above except that the initial state of both cells is focal conic and the cholesteric materials are in the form of a polymeric dispersion that will allow localized flow caused by the writing pressure from a pointed instrument such as a pointed untethered stylus to induce the planar texture. Droplets that are unconfined or are interconnecting allow liquid crystal flow to occur under the pressure of the stylus 280 in reduced cell gap regions 480 and 490. Flow does not occur and the liquid crystal texture does not change in undepressed regions 290.

A suitable voltage applied to the electrodes will drive the cholesteric material of both cells to the initial focal conic state (see FIG. 8). When viewed from above, the tablet will exhibit the color of the background coating 310 along with the pattern or design of the patterned layer since the focal conic texture is essentially transparent in this cell configuration. Black or blue are often preferred for the back layer 310. The pressure from the pointed stylus 280 in the locally reduced cell gap spacing 480, 490 induces flow in the cholesteric material that changes the cholesteric texture from the transparent focal conic to the color reflective planar texture in the vicinity of the tip of the stylus 280. The stylus is used to draw an image similar to drawing with a pencil on paper. The written image can then be entirely erased by applying a voltage pulse to the electrodes of sufficient value to drive all the material to the focal conic state (see FIG. 8 and the '448 patent for suitable voltage to apply to each liquid crystal layer).

The procedure of writing a multicolor image on the double stack writing tablet of Mode B is to first erase all previous images by activating both write circuits 460 and 470 to apply voltages of value Vf indicated by vertical line 410 of FIG. 8 to drive both cells 420 and 430 into the focal conic texture. The value of the voltage or magnitude of a voltage pulse to do this is well known in the art of a bistable cholesteric liquid crystal displays; e.g., U.S. Pat. Nos. 5,453,863 and 5,691,795. In order to write an image reflecting the color of the cholesteric 440 on the top cell 420 only using stylus 280 a voltage Vw is applied by the write circuit 470 to the electrodes of the bottom cell 430 during the writing process. The value of Vw is indicated by vertical line 400 of FIG. 8. The voltage is applied for the duration of the stylus write; preferably a continuous AC voltage or a sequence of bipolar pulses. The purpose of the voltage is to maintain the focal conic texture of the bottom cell 430 under the action of the stylus (i.e., prevent forming the planar texture in the written portion or depressed cell gap region of the bottom cell). While this voltage is applied the pressure of the stylus does not induce a planar texture in cell 430 but maintains its focal conic texture during the writing process. The stylus does, however, induce a planar texture in the cholesteric 440 of the upper cell 420 in its vicinity (i.e., in the writing portion) that is believed to be due to lateral flow of the cholesteric liquid crystal in the reduced gap regions resulting in the focal conic texture being transformed to the planar texture. This occurs without any voltage being applied to the upper cell. Therefore, an image on a focal conic background, in cooperation with the patterned layer, on a stacked multi-color cell is possible by suitably applying a voltage to allow the image to be written on only one cell. The image is composed of the writing portion at a color of the light reflected from the planar texture of the cholesteric 440 of the top cell 420 (added to any color of the back layer) on the unwritten and undepressed background (black or a back color of the back layer) in cooperation with the design or pattern of the patterned layer.

Similarly, in order to form an image on the bottom cell 430 only by stylus 280 a voltage Vw must be applied by the write circuit 460 to the electrodes of the top cell 420 during the writing process. As before, both cells are initially in the focal conic texture. The value of Vw is indicated by vertical line 400 of FIG. 8. The voltage is applied for the duration of the stylus write; preferably a continuous AC voltage or a sequence of bipolar pulses. The purpose of the voltage is to maintain the focal conic texture of the top cell 420 under the action of the stylus. While this voltage is applied the pressure of the stylus does not induce a planar texture in top cell 420 but maintains its focal conic texture from the erasure process. The stylus does, however, induce a planar texture in the bottom cell 430 due to induced lateral flow of the cholesteric liquid crystal (without applying voltage to the bottom cell), resulting in the focal conic texture being transformed to the planar texture in the reduced cell gap region of the bottom cell (i.e., in the written portion). This produces an image composed of the writing portion at a color of the light reflected from the planar texture of the cholesteric 450 bottom cell 430 (added to any color of the back layer) on the unwritten and undepressed background (black or a back color of the back layer) in cooperation with the design or pattern of the patterned layer. Therefore, a planar image on a focal conic background can be selectively written separately on each cell of the stack to produce a multiple color image.

IIc. Multimode Double Cell Writing Tablet:

The inventive writing tablet can also be designed so that one of the cells operates according to Mode A and the other cell operates according to Mode B. That is, one cell has an initial planar texture while the other cell has the initial focal conic texture. Writing in a color of only one of the cells (added to any back color) in cooperation with the design or pattern of the patterned layer is selected by applying the write voltage Vw to the other cell while writing pressure is applied. The background will have the color of the undepressed regions of the planar cell (added to any back color) in cooperation with the design or pattern of the patterned layer. For example, when a first cell desired to be selected is in the initial focal conic texture, the other second cell in the planar texture has the writing voltage Vw applied during the writing process. The planar texture is erased from the second layer in the written portion where the cell gap is reduced, as Vw is applied. The writing process forms the planar texture in the written portion of the first layer where the cell gap is reduced. The resulting image will be the written portion at the planar texture of the first layer only (added to any background color) on a background formed by the planar texture of undepressed regions of the second layer (added to any background color). Both the written portion and background cooperate with a design or pattern of the patterned layer.

Another way to form an image on the multimode, two layer writing tablet is by applying the write voltage to both cells, in effect, selecting the background. Upon writing, the planar texture is prevented from being formed in the written portion of the focal conic layer and the planar texture is erased to the focal conic in the written portion of the planar layer. This forms an image composed of a written portion in black or any back color on a background of the color reflected by the planar layer (added to any background color). The written portion and background cooperate with the design or image of the patterned layer.

Yet another way to form an image on the multimode, two layer writing tablet is by not applying the write voltage to either layer. The writing process will form the planar texture in the written portion of the focal conic layer and will not affect the planar texture existing in the written portion of the other planar layer. This will result in an image that is the addition of the colors reflected from both layers in their written portions (along with any back color) on a background that is the color of light reflected from the planar layer (added to any back layer color). Both the written portions and background cooperate with the design or pattern of the patterned layer.

It should be apparent from the foregoing that the cells can be designed the same or differently by changing the liquid crystal dispersion. In the initially planar cell, liquid crystal flow is not needed to change the planar texture to the focal conic in the layer where the writing voltage is applied. Therefore, the liquid crystal of this cell can be in confined droplets or in a dispersion of liquid crystal in a polymer matrix that does not encapsulate or confine the liquid crystal enabling it to flow. However, the liquid crystal in the initially focal conic cell must be in a dispersion that enables it to flow upon application of pressure from a pointed stylus. This allows the writing tablet to be formed from cells using different combinations of liquid crystal dispersions. For example, a writing tablet could be made so that both cells only have confined droplets of liquid crystal material in a polymer matrix using a PIPS process and will only operate in Mode A only. A writing tablet formed of unconfined droplets in both cells, or a writing tablet having a focal conic cell having unconfined droplets and confined or unconfined liquid crystal in the planar cell, could operate in Mode A, Mode B or in as a multimode writing tablet.

It should be appreciated in reading this disclosure that the writing tablet of this disclosure can have more than two liquid crystal layers as in the case of a triple stack display disclosed in the Ser. No. 12/152,729 patent application, which can have liquid crystal layers reflecting red, green and blue, respectively, in any order.

Triple Cell Writing Tablet

Figure 9B:
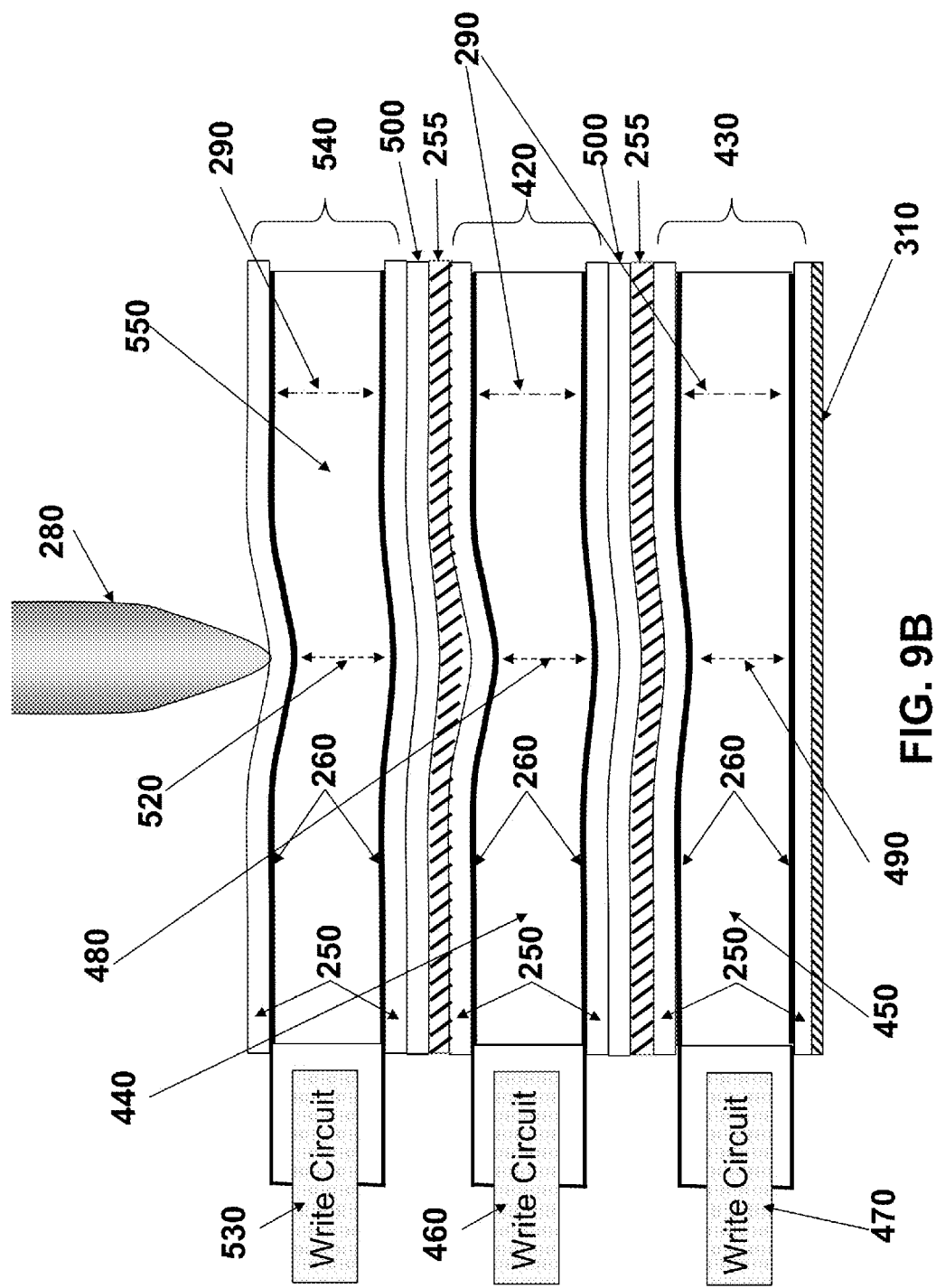
FIG. 9B: Schematic illustration of a triple stack multicolor writing tablet with patterned ink between the display layers.

The triple cell writing tablet device can be made with either stacked separate cells or as a single unit sharing substrates. The word "cell" as used herein means an active layer, the electrodes on either side of it, and any substrates flanking the electrodes (i.e., on either side of the electrodes). In FIG. 9B, completed cells 420, 430, and 540 comprising different color active layers can be stacked as separate units each having separate substrate 250 with an electrode 260 on an inside surface of it, the internal substrates 250 being joined with an index matching material 500 in between them and a patterned ink layer 255.

In describing Mode A, we refer to FIG. 9B which is an illustration of a writing tablet having triple stack cells. The multiple-color triple-stack tablet of FIG. 9B is made up of three cells, cell 420 stacked on top of cell 430 and cell 540 stacked on top of cell 420. Cells 420 and 540 are of the same construction as cell 340 of FIG. 7 containing transparent substrates 250 with transparent conducting electrodes 260, connected to a writing circuit 330; however the background coating 310 is absent. Cell 420 is stacked on top as well as optically coupled to cell 430 so as to match the index of refraction of adjacent substrates. One means of optical coupling is with a thin layer of optical index matching fluid between cells 420, 430, and 540. Cell 430 is also identical in construction to cell 340 of FIG. 7 with transparent substrates 250 and transparent conducting electrodes 260 that are electrically connected to writing circuit 330 as well as containing background coating 310.

Cells 420, 430, 540 are filled with a cholesteric liquid crystal material 440, 450, 550, respectively. However, the cholesteric material within each cell has a different reflective color than the other cell. For example, 440 may be a cholesteric material that reflects blue light while 450 may be a cholesteric material that reflects yellow light and 550 may be a cholesteric liquid crystal material that reflects green light. In certain applications it may be desired that materials 440, 450 and 550 have a different handedness for the helical twist; that is, one cell reflects right handed circular polarization and another left. Like the cholesteric material 320 of FIG. 7, the cholesteric materials 440, 450 and 550 of FIG. 9B are particularly in the form of a polymeric dispersion. The droplets can be confined as separate droplets within the dispersion since flow of the liquid crystal is not required for this embodiment of the multiple color writing tablet. Materials 440, 450, and 550 however, may also be a droplet dispersion in which the droplets are unconfined with interconnecting droplets since flow will not affect its operation. The dispersions may be of the type prepared by water borne emulsions or by polymerization induced phase separation as is known in the art.

Writing Tablet with Semitransparent Back Layer

FIG. 10A-C are perspective, side and top views, respectively, of an electronic display of this disclosure showing the process of a removable back pattern 180 being positioned at a back of the display behind back substrate 200 in a direction of the arrow (e.g., removable in a direction opposite the arrow). The back pattern shown in FIG. 10 is represented generally by 180 and can be selected from the group consisting of a template of a sports field, court or arena, a pattern for a children's game, an image for children to color, notepad lines, graph paper lines, or a menu of items that one can choose from.

Referring to FIGS. 10A-10C, an electronic display 190 (e.g., a writing tablet) provides a means for changing background images with surprisingly little loss in display contrast or brightness. A writing tablet utilizes a semitransparent back layer (e.g., a color filter) 200 as the display background. The semitransparent layer reflects grey or light of a color; it also absorbs certain wavelengths of light; and light is also transmitted through the semitransparent layer. One method of making the semitransparent layer is by coating printing process inks on the back of a transparent substrate in place of the opaque absorbing ink of the prior art. The thickness of the ink coatings determines the level of transparency that can be anywhere from 0.1% to 99% for any given wavelength. Alternatively, it is possible to use a commercial color filter like Roscolux™ brand of filters from Rosco Laboratories Inc., as the back substrate 200 this will serve the same purpose as the coated ink. The semitransparent back layer 200 enables a broader use for the writing tablet by employing the back layer 180 selected from templates, other sheet material, electronic skins, waveguides and even a digital display near the back layer to enable a changeable background for the display.

The writing tablet 190 is constructed with upper transparent substrate 240 facing the viewer and the lower substrate 200 which is a color filter. Substrates 240 and 200 are coated with transparent electrically conductive layers 230 and 210, respectively. A preferred conductor for the electrically conductive layers is a conducting polymer because of its flexibility. At least one patterned ink layer is employed in the writing tablet 190, for example, on the upper substrate 240 as shown. The patterned ink layer is shown as 255 in FIG. 10A, C. The patterned ink layer 255 is on the front of the display and can allow the display to have different display colors due to the color mixing of the patterned ink and the ChLC. The ink can be semitransparent or opaque. Sandwiched between substrates 230 and 210 adjacent to the conductors is a cholesteric liquid crystal dispersion 200 as for example described in U.S. Patent Application Publication No. 2009/0033811. The dispersion 200 controls the flow of the liquid crystal with a polymer network to have the proper sensitivity to the writing stylus. Instead of a dispersion, a polymer-free cholesteric liquid crystal 200 may be used with spacers in high density in the space between the electrodes to control flow and sensitivity as described in U.S. patent application Ser. No. 13/281, 911. The color filter 200 is used as the bottom substrate, so that it is possible to view images on the template 180 or other objects placed behind the display 190. The semitransparent back layer 200 may be realized by coating inks on a transparent substrate such as the 80 series inks from Norcote Corporation. For example, the patterned layer or template 180 can be lines to aid in writing text on the tablet or it can be a figure such as a basketball court such as might be used by a coach to explain strategy and plays to his players. The template may also be figures for playing games or a learning aid for a child.

Figure 11:
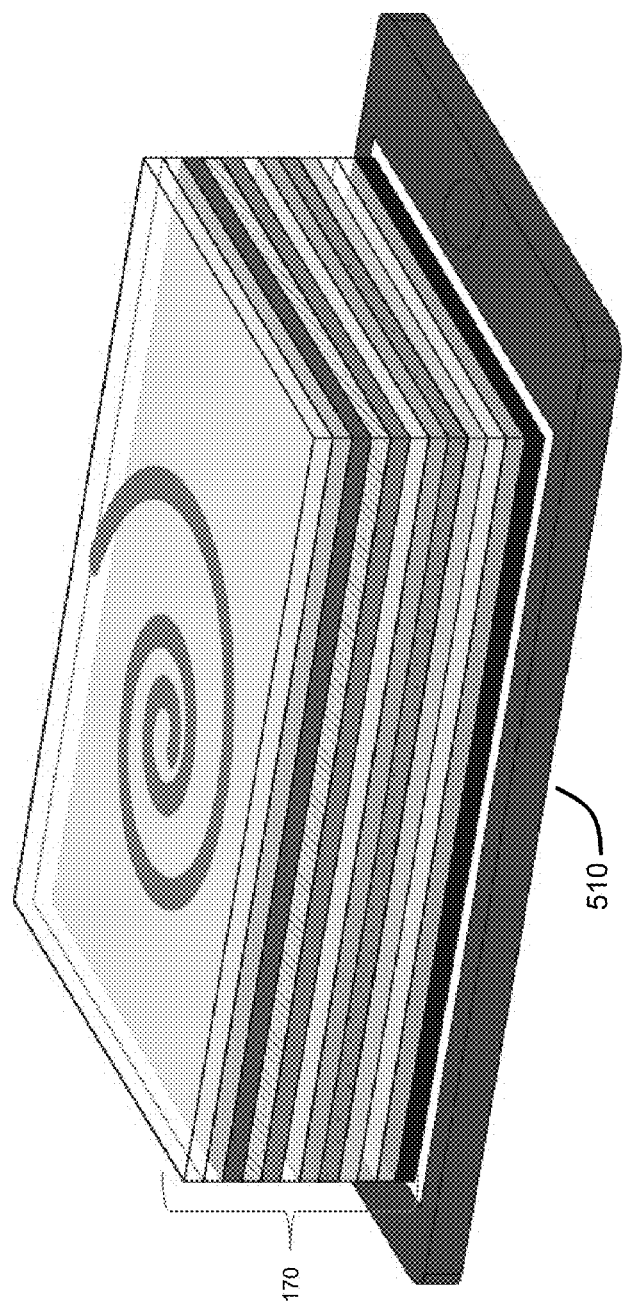
FIG. 11 is a perspective view of an electronic display of this disclosure and an article comprising the electronic display.

FIG. 11 is a perspective view of an electronic display of this disclosure in the form of decorative electronic skin 170, and an article comprising the electronic skin represented generally by 510. The article 510 is selected from the group consisting of cell phone, laptop, computer, computer monitor, computer mouse, computer keyboard, television, I-pod, MP3 player, PDA, video game controller, stereo, radio, CD player, appliance, toy, headphones, clock, handheld electronic devices, key ring accessory, shoe, purse, backpack, briefcase, computer case, computer covering, jewelry, watch, bottle, bottle lid, clothing, clothing embellishment, furniture, furniture embellishment, mobile entertainment case and combinations thereof.

The description will now present the following examples which should not be used to limit the invention that is described in the claims.

Example 1

A multi-color pattern display was created by printing a pattern on the front of a stack display made of two ChLC plastic displays. The plastic displays include three polyethylene terephthalate (PET) plastic substrates coated with conductive electrodes. The three plastic substrates are laminated together with an encapsulated ChLC in-between. The encapsulated ChLC, for both displays, is a photopolymerizable mixture consisting of KLC19 liquid crystal (Kent Displays, Inc.) and a photoinitiated prepolymerized mixture. The display shown here is presented in the Montbach et al paper.

For the bottom display a photopolymerizable mixture was made to have a Bragg reflective peak of 655 nm. For the top display a photopolymerizable mixture was made to have a Bragg reflective peak of 550 nm. For both mixtures the liquid crystal components were heated to isotropic then vortex-mixed to ensure a complete homogeneous mixture. Once cooled the prepolymerized mixture was added and vortex-mixed. To preserve substrate spacing before polymerization plastic spherical spacers were added to both mixtures. 4.5 μm plastic spherical spacers, were added to the 655 nm mixture while 4.0 μm plastic spherical spacers, were added to the 550 nm mixture. Both mixtures were then sonicated, using an ultrasonic bath.

Lamination of the plastic and the two photopolymerized mixtures was done separately. First, a bead of the 655 nm mixture was pipetted between two PET substrates coated with conductive electrodes. The top substrate was coated, with conductive electrodes, on both sides in order to stack the other display on top. The bead was then rolled down the two PET substrates. The material was then polymerized under an IntelliRay 400 UV source. Next, a bead of the 550 nm mixture was pipetted between the top of the 655 nm display and a sheet of PET, coated with conductive electrodes, substrate. The bead was then rolled down the bottom display and the PET substrate. The material was then polymerized under an IntelliRay 400 UV source.

The above stacked display was then screen printed with a polyester screen ink. Three colors were made using Nazdar 9600 series ink. A pantone PMS 7527C equivalent was made using Nazdar 9650 at 89.19% wt., Nazdar 96LF11 at 9.77% wt., Nazdar 96LF20 at 0.62% wt., and Nazdar 9624 at 0.42% wt. A pantone PMS4625C equivalent was made using Nazdar 96LF20 at 44.79% wt., Nazdar 96LF12 at 29.25% wt., Nazdar 9619 at 11.15% wt., and Nazdar 9624 at 14.81% wt. A pantone PMS4645C equivalent was made using Nazdar 9650 at 33.3% wt. and the pantone PMS4625C mixture made above at 66.7% wt. Once the components were measured into a suitable container they were stirred for approximately 5 minutes. Using standard screen printing techniques and a 350 yellow mesh screen with desired patterns the stack display was screen printed. PMS7527C mixture was patterned first on to the viewing side of the display. Once screened the display was placed in an oven set to 65° C. to cure ink. After 15 minutes the display was removed and another top pattern is screen printed, with PMS4645C mixture, on the viewing side. Once screened the display was placed in an oven set to 65° C. to cure ink. After 15 minutes the stack display was removed and back side is screen printed, with PMS4645C mixture, with an unpattern screen. Lastly, the display was placed in an oven set to 65° C., to cure ink, for 15 minutes resulting in a multi-color pattern display. The display was observed to work and as illustrated in FIG. 4.

Example 2

A multiple color, double stack, single pixel display with blue and yellow reflective, flexible cholesteric liquid crystals displays was fabricated to demonstrate the inventive concepts of the various color combinations with the addition of semi-transparent patterned ink over the top substrate.

The multiple color cholesteric liquid crystal display is constructed by building two flexible displays. The displays are fabricated from three polyethylene terephthalate (PET) plastic substrates coated with conductive electrodes. The three plastic substrates are laminated together with an encapsulated ChLC in-between. The encapsulated ChLC, for both displays, is a photopolymerizable mixture consisting of KLC19 liquid crystal (Kent Displays, Inc.) and a photoinitiated prepolymerized mixture. The display shown here is very similar to the one presented in the Montbach et al paper, except the colors of the ChLC layers are different and the printed ink image location and colors are also different.

For the bottom display a photopolymerizable mixture was made to have a Bragg reflective peak of 580 nm. For the top display a photopolymerizable mixture was made to have a Bragg reflective peak of 460 nm. For both mixtures the liquid crystal components were heated to isotropic then vortex-mixed to ensure a complete homogeneous mixture. Once cooled the prepolymerized mixture was added and vortex-mixed. To preserve substrate spacing before polymerization plastic spherical spacers were added to both mixtures. 4.0 µm plastic spherical spacers, were added to the 580 nm mixture while 3.5 µm plastic spherical spacers, were added to the 460 nm mixture. Both mixtures were then sonicated, using an ultrasonic bath.

Lamination of the plastic and the two photopolymerized mixtures was done separately. First, a bead of the 580 nm mixture was pipetted between two PET substrates coated with conductive electrodes. The top substrate was coated, with conductive electrodes, on both sides in order to stack the other display on top. The bead was then rolled down the two PET substrates. The material was then polymerized under an IntelliRay 400 UV source. Next, a bead of the 460 nm mixture was pipetted between the top of the 580 nm display and a sheet of PET, coated with conductive electrodes, substrate. The bead was then rolled down the bottom display and the PET substrate. The material was then polymerized under an IntelliRay 400 UV source.

Next, the desired pattern is ink jetted onto a clear plastic sheet using an HP Color Laser Jet Printer 3600n. In this case, the pattern is a square divided into four different sections of different colors (red, yellow, green and blue). The colors are translucent and specifically designed so that when the display is reflecting light, the color combination results in the desired color. The patterned ink sheet is then laminated to the top of the display using optically clear adhesive that is 2 mil thick (3M part #8212).

Once the display is constructed, the two layers of the display are electrically addressed individually. When the blue layer is electrically switched to the planar texture and the yellow layer is switched to the focal conic texture, the stacked display reflects blue. When the yellow layer is electrically switched to the planar texture, and the blue layer is electrically switched to the focal conic, the display reflects yellow. When both layers are electrically switched to the planar texture, the combination results in a reflection of white. When both layers are electrically switched to the focal conic texture, the light is absorbed in the black back layer resulting in a dark appearance. With the addition of the patterned ink on the top substrate, different colors are reflected to the viewer due to the patterned ink filtering the white color reflected from the display. For example, when both layers of the display are switched to the planar texture, and therefore reflecting white, the display reflects green through the green section, blue through the blue section, red through the red section, and yellow through the yellow section of the printed ink. When both of the layers are electrically switched to the focal conic texture, no sections of the pattern reflect any color, and this results in a dark appearance. With this construction, multiple specific color requirements are achievable while switching the display between just two states, making several possible applications attainable.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. An electronic display comprising:
   electrically conductive layers;
   at least one active layer disposed between adjacent said electrically conductive layers, said active layer including cholesteric liquid crystal material that reflects color light;
   a front transparent substrate behind which said electrically conductive layers are disposed;
   a back component disposed at a back of the display below said active layer;
   at least one patterned layer including a printed color ink disposed at at least one of the following locations: on or near said front substrate, as an outer layer of a front of said display and as an interlayer between said front substrate and said back component, said printed color ink being semitransparent; and
   electronic circuitry for applying a voltage to said conductive layers that enables at least one of erasing or writing of said active layer,
   wherein said reflected color light of said active layer mixes with said printed color ink of the at least one said patterned layer to produce a color image on said display.

2. The electronic display of claim 1 wherein said voltage is applied as one or more voltage pulses or as a continuous voltage.

3. The electronic display of claim 1 wherein a portion of or an entire area of said electrically conductive layers are patterned into a passive matrix.

4. The electronic display of claim 3 wherein said passive matrix comprises one of said electrically conductive layers forming rows of substantially parallel electrode lines on one side of said active layer and another of said electrically conductive layers forming columns of substantially parallel electrode lines on the other side of said active layer, wherein said columns are substantially orthogonal to said rows.

5. The electronic display of claim 1 including a back substrate at a back of the display below said active layer, wherein said back component includes a back pattern disposed behind said back substrate including printed color ink, said electrically conductive layers being disposed between said front substrate and said back substrate, wherein said back substrate is transparent or semitransparent, wherein said reflected color light of said active layer mixes with said printed color ink of the at least one said patterned layer and with said printed color ink of said back pattern to produce the color image on the display.

6. The electronic display of claim 5 wherein said back component comprises an emissive, backlit or reflective display device for displaying images that form the back pattern.

7. The electronic display of claim 6 wherein said display device is a bistable cholesteric liquid crystal display.

8. The electronic display of claim 1 wherein said back component comprises an opaque light absorbing layer.

9. The electronic display of claim 1 wherein said reflected color of the at least one said active layer is selected so as to change an appearance of all or a portion of the at least one said patterned layer.

10. The electronic display of claim 1 comprising at least two or three of said active layers stacked on top of each other, each of said active layers being comprised of cholesteric liquid crystal material, wherein each of said active layers is disposed between two adjacent said electrically conductive layers.

11. The electronic display of claim 10 comprising three of said active layers reflecting red, green and blue, in any order.

12. The electronic display of claim 1 which is in a form of a decorative electronic skin.

13. An article comprising the electronic skin of claim 12 selected from the group consisting of cell phone, laptop, computer, computer monitor, computer mouse, computer keyboard, television, I-pod, MP3 player, PDA, video game controller, stereo, radio, CD player, appliance, toy, headphones, clock, handheld electronic devices, key ring accessory, shoe, purse, backpack, briefcase, computer case, computer covering, jewelry, watch, bottle, bottle lid, clothing, clothing embellishment, furniture, furniture embellishment, mobile entertainment case and combinations thereof.

14. The electronic display of claim 1 which is a writing tablet.

15. An electronic display comprising:
electrically conductive layers;
at least one active layer disposed between adjacent said electrically conductive layers, said active layer including cholesteric liquid crystal material;
a front transparent substrate behind which said electrically conductive layers are disposed;
a back component disposed at a back of the display below said active layer;
at least one patterned layer disposed at at least one of the following locations: on or near said front substrate, as an outer layer of a front of said display and as an interlayer between said front substrate and said back component, said patterned layer being opaque or semitransparent; and
electronic circuitry for applying a voltage to said conductive layers that enables at least one of erasing or writing of said active layer,
including a back substrate at a back of the display below said active layer, wherein said back component includes a back pattern disposed behind said back substrate, said electrically conductive layers being disposed between said front substrate and said back substrate, wherein said back substrate is transparent or semitransparent and said patterned layer, said active layer and said back pattern form the image on the display,
wherein said back pattern is removable and is selected from the group consisting of a template of a sports field, court or arena, a pattern for a children's game, an image for children to color, notepad lines, graph paper lines, or a menu of items that one can choose from.

16. A writing tablet comprising:
electrically conductive layers;
at least one liquid crystal writing layer disposed in a gap between adjacent said electrically conductive layers, said liquid crystal writing layer including bistable cholesteric liquid crystal material;
a front substrate comprised of flexible transparent material, said electrically conductive layers being disposed behind said front substrate;
a back component disposed at a back of said writing tablet below said liquid crystal writing layer;
wherein said liquid crystal writing layer is adapted to enable writing pressure applied to said front substrate to reduce a thickness of said gap to form a reduced gap region in which the liquid crystal is light reflecting so as to reflect color light or is essentially transparent, a texture of said liquid crystal being unchanged in a non-reduced gap region, thereby forming a written line composed of said color light reflected from said liquid crystal writing layer;
at least one patterned layer including a printed color ink disposed at at least one of the following locations: on or near said front substrate, as an outer layer of a front of said writing tablet and as an interlayer between said front substrate and said back component, said patterned layer being opaque or semitransparent; and
electronic circuitry for applying a voltage to said conductive layers that enables at least one of erasing or writing of said liquid crystal writing layer;
wherein said written line composed of said color light reflected from said liquid crystal writing layer mixes with said printed color ink of the at least one said patterned layer to produce a color image on said writing tablet.

17. The writing tablet of claim 16 wherein said voltage is applied as one or more voltage pulses or as a continuous voltage.

18. The writing tablet of claim 16 wherein a portion of or an entire area of said electrically conductive layers are patterned into a passive matrix.

19. The writing tablet of claim 18 wherein said passive matrix comprises one of said electrically conductive layers forming rows of substantially parallel electrode lines on one side of said liquid crystal writing layer and another of said electrically conductive layers forming columns of substantially parallel electrode lines on the other side of said liquid crystal writing layer, wherein said columns are substantially orthogonal to said rows.

20. The writing tablet of claim 16 including a back substrate at a back of the display below said active layer, wherein said back component includes a back pattern disposed behind said back substrate including printed color ink, said electrically conductive layers being disposed between said front substrate and said back substrate, wherein said back substrate is transparent or semitransparent, wherein said reflected color light of said active layer mixes with said printed color ink of the at least one said patterned layer and with said printed color ink of said back pattern to produce the color image on the writing tablet.

21. The writing tablet of claim 20 wherein said back component comprises an emissive, backlit or reflective display device for displaying images that form the back pattern.

22. The writing tablet display of claim 21 wherein said display device is a bistable cholesteric liquid crystal display.

23. The writing tablet of claim 16 wherein said back component comprises an opaque light absorbing layer.

24. The writing tablet of claim 16 wherein said color reflected by the at least one said liquid crystal writing layer is selected so as to change an appearance of the at least one said patterned layer.

25. The writing tablet of claim 16 comprising at least two or three of said active layers stacked on top of each other, wherein each of said active layers is disposed between two adjacent said electrically conductive layers.

26. The writing tablet of claim 25 comprising three of said active layers reflecting red, green and blue, in any order.

27. The writing tablet of claim 16 which is in a form of a decorative electronic skin.

28. An article comprising the electronic skin of claim 27 selected from the group consisting of cell phone, laptop, computer, computer monitor, computer mouse, computer keyboard, television, I-pod, MP3 player, PDA, video game controller, stereo, radio, CD player, appliance, toy, headphones, clock, handheld electronic devices, key ring accessory, shoe, purse, backpack, briefcase, computer case, computer covering, jewelry, watch, bottle, bottle lid, clothing, clothing embellishment, furniture, furniture embellishment, mobile entertainment case and combinations thereof.

29. The writing tablet of claim 16 wherein said electronic circuitry applies an erasing said voltage to said conductive layers for said liquid crystal writing layer, wherein said erasing voltage enables said liquid crystal of said liquid crystal writing layer to be placed in said light reflecting texture or in said substantially transparent focal conic texture.

30. The writing tablet of claim 16 wherein said electronic circuitry applies a writing said voltage to said electrically conductive layers, said writing pressure being applied while applying said writing voltage effective to place said reduced gap region of said liquid crystal writing layer in said essentially transparent focal conic texture while not changing said texture of an unreduced gap region of said liquid crystal writing layer.

31. A writing tablet comprising:
electrically conductive layers;
at least one active layer disposed in a gap between adjacent said electrically conductive layers, said active layer including bistable cholesteric liquid crystal material;
a front substrate comprised of flexible transparent material forming a writing surface, said electrically conductive layers being disposed behind said front substrate;
a back component disposed at a back of the display below said active layer;
wherein said active layer is adapted to enable writing pressure applied to said writing surface to reduce a thickness of said gap to form a reduced gap region in which the liquid crystal is light reflecting so as to reflect light of a color or is essentially transparent, a texture of said liquid crystal being unchanged in a non-reduced gap region;
at least one patterned layer disposed at at least one of the following locations: on or near said front substrate, as an outer layer of a front of said writing tablet and as an interlayer between said front substrate and said back component, said patterned layer being opaque or semi-transparent; and
electronic circuitry for applying a voltage to said conductive layers that enables at least one of erasing or writing of said active layer;
including a back substrate at a back of the writing tablet below said active layer, wherein said back component includes a back pattern disposed behind said back substrate, said electrically conductive layers being disposed between said front substrate and said back substrate, wherein said back substrate is transparent or semitransparent and said patterned layer, said active layer and said back pattern form the image on the display,
wherein said back pattern is removable and is selected from the group consisting of a template of a sports field, court or arena, a pattern for a children's game, an image for children to color, notepad lines, graph paper lines, or a menu of items that one can choose from.

32. A multicolor writing tablet comprising:
electrically conductive layers;
at least two liquid crystal writing layers stacked over each other each disposed in a gap between adjacent said conductive layers, said liquid crystal writing layers including bistable cholesteric liquid crystal material;
a front substrate of flexible transparent material;
a back component disposed at a back of the display below said liquid crystal writing layers;
wherein said liquid crystal writing layers are adapted to enable writing pressure applied to said front substrate to reduce thickness of said gaps to form reduced gap regions;
at least one patterned layer disposed at at least one of the following locations: on or near said front substrate, as an outer layer of a front of said writing tablet, and between said front substrate and said back component, said patterned layer being opaque or semitransparent;
electronic circuitry for applying erasing and writing voltages to said conductive layers for each of said liquid crystal writing layers;
wherein said erasing voltage enables said liquid crystal of each of said liquid crystal writing layers to be placed in a light reflecting texture so as to reflect color light or enables said liquid crystal of each of said liquid crystal writing layers to be placed in an essentially transparent focal conic texture; and
wherein said writing voltage enables writing in a color that is selected from any of said liquid crystal writing layers by applying said writing voltage to said conductive layers for a non-selected said liquid crystal writing layer while applying said writing pressure to said front substrate, enabling said reduced gap region of said non-selected said liquid crystal writing layer to be in said substantially transparent focal conic texture and by not applying said writing voltage to said conductive layers for said selected liquid crystal writing layer while applying said writing pressure to said front substrate, enabling said reduced gap region of said selected liquid crystal writing layer to reflect said color of said selected liquid crystal writing layer, thereby forming a written line composed of said color light reflected from said selected liquid crystal writing layer;
wherein said written line composed of said color light reflected from said selected liquid crystal writing layer mixes with the at least one said patterned layer to produce a color image on said writing tablet.

33. A writing tablet comprising:
electrically conductive layers;
only a single liquid crystal writing layer in said writing tablet, said liquid crystal writing layer being disposed in a gap between adjacent said electrically conductive layers, said liquid crystal writing layer including bistable cholesteric liquid crystal material;
a front substrate comprised of flexible transparent material, said electrically conductive layers being disposed behind said front substrate;
a back component disposed at a back of the writing tablet below said liquid crystal writing layer;
wherein said liquid crystal writing layer is adapted to enable writing pressure applied to said front substrate to reduce a thickness of said gap to form a reduced gap region in which the liquid crystal is light reflecting so as to reflect color light or is essentially transparent, a texture of said liquid crystal being unchanged in a non-reduced gap region, thereby forming a written line composed of said color light reflected from said liquid crystal writing layer;

at least one patterned layer including printed color ink and being located in front of said back component, said printed color ink being semitransparent; and electronic circuitry for applying a voltage to said conductive layers that enables at least one of erasing or writing of said written line;

wherein said written line composed of said color light reflected from said liquid crystal writing layer mixes with said printed color ink of the at least one said patterned layer to produce a color image on said writing tablet.

34. The writing tablet of claim 33 wherein said back component includes cholesteric liquid crystal electronic skin.

35. The writing tablet of claim 33 wherein said back component comprises an opaque light absorbing layer.

36. A writing tablet comprising:
electrically conductive layers;
a liquid crystal writing layer in said writing tablet, said liquid crystal writing layer being disposed in a gap between adjacent said electrically conductive layers, said liquid crystal writing layer including bistable cholesteric liquid crystal material;
a front substrate comprised of flexible transparent material, said electrically conductive layers being disposed behind said front substrate;
a back component disposed at a back of the writing tablet below said liquid crystal writing layer;

wherein said liquid crystal writing layer is adapted to enable writing pressure applied to said front substrate to reduce a thickness of said gap to form a reduced gap region in which the liquid crystal is light reflecting so as to reflect light or is essentially transparent, a texture of said liquid crystal being unchanged in a non-reduced gap region, thereby forming a written line composed of said light reflected from said liquid crystal writing layer;

at least one patterned layer including printed ink and being located as an outer layer of said writing tablet, said printed ink being semitransparent; and electronic circuitry for applying a voltage to said conductive layers that enables at least one of erasing or writing of said written line;

wherein said written line composed of said light reflected from said liquid crystal writing layer mixes with said printed ink of the at least one said patterned layer to produce an image on said writing tablet.

37. The writing tablet of claim 36 comprising a semitransparent back layer behind said liquid crystal writing layer, said semitransparent back layer including printed ink, wherein said back component includes a back pattern including a template of a sports field, court or arena, a pattern for a children's game, an image for children to color, notepad lines, graph paper lines, or a menu of items that one can choose from.

* * * * *